US012675522B1

(12) United States Patent
Li

(10) Patent No.: US 12,675,522 B1
(45) Date of Patent: *Jul. 7, 2026

(54) METHOD AND SYSTEM FOR MUSIC AND DANCE RECOMMENDATIONS

(71) Applicant: Dance4Healing Inc., Sunnyvale, CA (US)

(72) Inventor: Amy Chunmei Li, Sunnyvale, CA (US)

(73) Assignee: Dance4Healing Inc., Sunnyvale, CA (US)

( * ) Notice: Subject to any disclaimer, the term of this patent is extended or adjusted under 35 U.S.C. 154(b) by 426 days.

This patent is subject to a terminal disclaimer.

(21) Appl. No.: 18/342,373

(22) Filed: Jun. 27, 2023

Related U.S. Application Data

(63) Continuation-in-part of application No. 16/900,883, filed on Jun. 13, 2020, now Pat. No. 11,783,723.

(60) Provisional application No. 62/860,957, filed on Jun. 13, 2019.

(51) Int. Cl.
  G06F 16/435         (2019.01)
  G10L 25/63         (2013.01)
(52) U.S. Cl.
  CPC ............ G06F 16/437 (2019.01); G10L 25/63 (2013.01)
(58) Field of Classification Search
  CPC .... G09B 19/0015; G09B 5/065; G16H 20/30; G16H 50/20; G06N 20/00; G06N 5/04; A61B 5/165; A61B 5/167; G06Q 50/01
  See application file for complete search history.

(56) References Cited

U.S. PATENT DOCUMENTS

| | | | | |
|---|---|---|---|---|
| 5,830,107 | A * | 11/1998 | Brigliadoro ...... | A63B 23/03575 |
| | | | | 482/3 |
| 6,227,968 | B1 | 5/2001 | Suzuki et al. | |
| 6,410,835 | B2 | 6/2002 | Suzuki et al. | |
| 6,782,308 | B2 | 8/2004 | Yamaura | |
| 8,057,290 | B2 | 11/2011 | Vance et al. | |
| 8,260,778 | B2 | 9/2012 | Ghatak | |
| 8,326,584 | B1 | 12/2012 | Wells et al. | |
| 8,444,464 | B2 | 5/2013 | Boch et al. | |
| D689,902 | S | 9/2013 | Carriuolo et al. | |
| 8,562,403 | B2 | 10/2013 | Boch et al. | |
| 10,086,283 | B2 * | 10/2018 | Trewartha ............. | A63F 13/211 |
| 10,268,808 | B2 * | 4/2019 | Lyske .............. | G11B 20/00891 |
| 11,657,553 | B2 * | 5/2023 | Troutman ............... | G06T 11/60 |
| | | | | 345/619 |
| 2002/0019258 | A1 * | 2/2002 | Kim ........................ | A63F 13/45 |
| | | | | 463/36 |
| 2006/0266200 | A1 * | 11/2006 | Goodwin ................. | G10H 1/40 |
| | | | | 84/611 |

(Continued)

*Primary Examiner* — Malina D. Blaise
(74) *Attorney, Agent, or Firm* — Duane Morris LLP; Thomas J. Kowalski

(57) ABSTRACT

A method and system that includes at least one processor, the at least one computer in communication with at least one data storage unit, the at least one computer programmed and/or configured to: generate a plurality of dance sequences; associate or cause the association of each of the plurality of dance sequences with at least one dance corpus classification; generate, for each of the plurality of users, a user profile; receive, from each of the plurality of users, at least one preference data; associate or causing the association of each of the user's profile with at least one preference data; and generate a recommendation of a dance sequence for each of the plurality of users.

20 Claims, 16 Drawing Sheets

700

701

702

(56) References Cited

U.S. PATENT DOCUMENTS

| | | | |
|---|---|---|---|
| 2008/0234023 A1* | 9/2008 | Mullahkhel | A63F 13/211 |
| | | | 463/7 |
| 2010/0022287 A1 | 1/2010 | Chiwata | |
| 2010/0041454 A1 | 2/2010 | Huang | |
| 2010/0045609 A1* | 2/2010 | Do | G06F 3/011 |
| | | | 345/173 |
| 2010/0113117 A1 | 5/2010 | Ku et al. | |
| 2011/0040707 A1 | 2/2011 | Theisen et al. | |
| 2011/0306396 A1 | 12/2011 | Flury et al. | |
| 2012/0088216 A1* | 4/2012 | Wexler | G09B 5/00 |
| | | | 434/322 |
| 2012/0094730 A1 | 4/2012 | Egozy | |
| 2012/0143358 A1* | 6/2012 | Adams | G06F 3/04815 |
| | | | 700/92 |
| 2012/0151344 A1* | 6/2012 | Humphrey | G09B 19/0015 |
| | | | 715/716 |
| 2014/0070957 A1* | 3/2014 | Longinotti-Buitoni | |
| | | | G06F 1/163 |
| | | | 340/870.01 |
| 2016/0216130 A1* | 7/2016 | Abramson | G01C 21/3423 |
| 2017/0259120 A1* | 9/2017 | King | H04L 67/306 |
| 2017/0263147 A1* | 9/2017 | King | G11B 27/026 |
| 2018/0012389 A1* | 1/2018 | Kishi | G10H 1/00 |
| 2018/0025004 A1* | 1/2018 | Koenig | G06F 16/435 |
| | | | 715/748 |
| 2018/0036591 A1* | 2/2018 | King | H04N 5/76 |
| 2018/0181730 A1* | 6/2018 | Lyske | G06F 21/16 |
| 2018/0214777 A1* | 8/2018 | Hingorani | A63F 13/5255 |
| 2019/0049968 A1* | 2/2019 | Dean | A61G 5/04 |
| 2019/0122577 A1* | 4/2019 | Mora | G09B 5/06 |
| 2019/0240539 A1* | 8/2019 | Perlman | A63B 24/0075 |
| 2020/0286505 A1* | 9/2020 | Osborne | G06N 7/01 |
| 2020/0342646 A1* | 10/2020 | Wang | G06N 3/0455 |

* cited by examiner

100

200

User Activity Profile

300

302 Dance Corpus Item

304 Unique identifier

306 Name

308 Tags

310 Usage data

Database

400

404
EHR System

406
Mobile/Wearable
Devices

Start

402 Profile data is obtained

408 Situational data is added

410 Real-time emotion gathering

412 AI recommends dance/music and teacher/buddy/
group

414 Patient carries out dance sequences. Activity data is tracked

416 Patient votes

418 Patient send messages

420 AI system refines recommendations

600

AI recommends a committed behavior change buddy

Buddy Matched based on

602 Health & Exercise History Data

604 Preference Data

606 Personality Type

608 Geo-Location

610 Energy Level

612 Range of Motion

614 Motivation Measures/Scales

616 Barrier Assessment

618 Duration of Dance: Availability and Capability

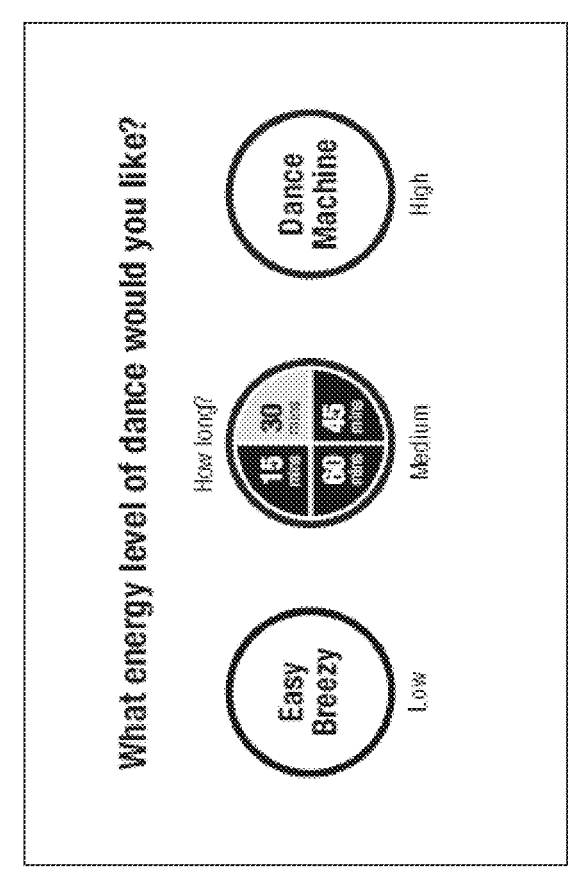
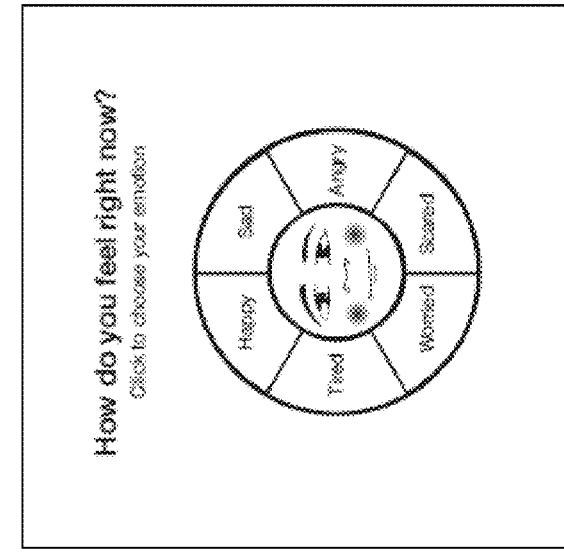
Figure 7

900

902  Get user preference tags Ui

904  Assign each dance i a score Di = 0

906  For each dance go over all tags Tij
If Tij=Uj
increment Di

908  For each dance i dance is liked/favored/
saved to list increment Di. If disliked, Di
< Di - D, whereas D is a preset factor 910  Display top result Di

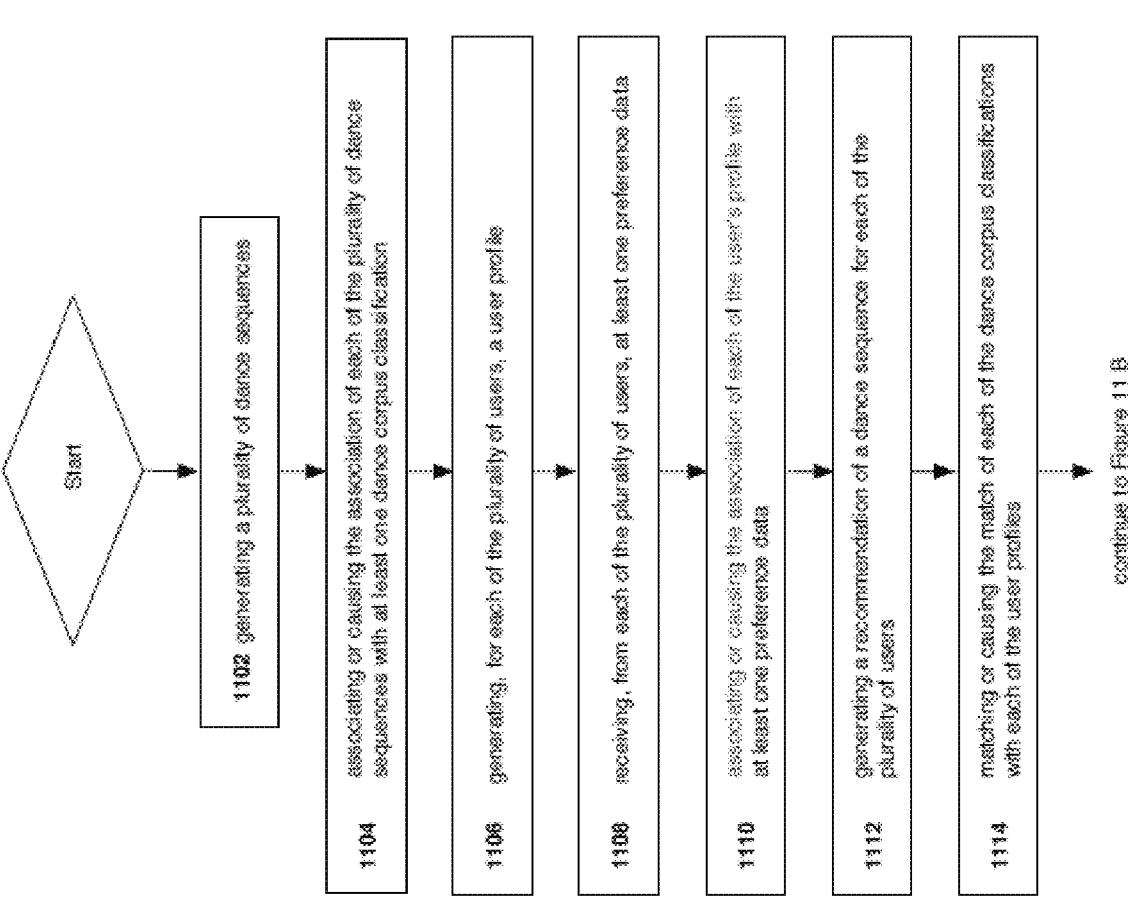

Start 1102 generating a plurality of dance sequences 1104 associating or causing the association of each of the plurality of dance sequences with at least one dance corpus classification 1106 generating, for each of the plurality of users, a user profile 1108 receiving, from each of the plurality of users, at least one preference data 1110 associating or causing the association of each of the user's profile with at least one preference data 1112 generating a recommendation of a dance sequence for each of the plurality of users 1114 matching or causing the match of each of the dance corpus classifications with each of the user profiles continue to Figure 11 B

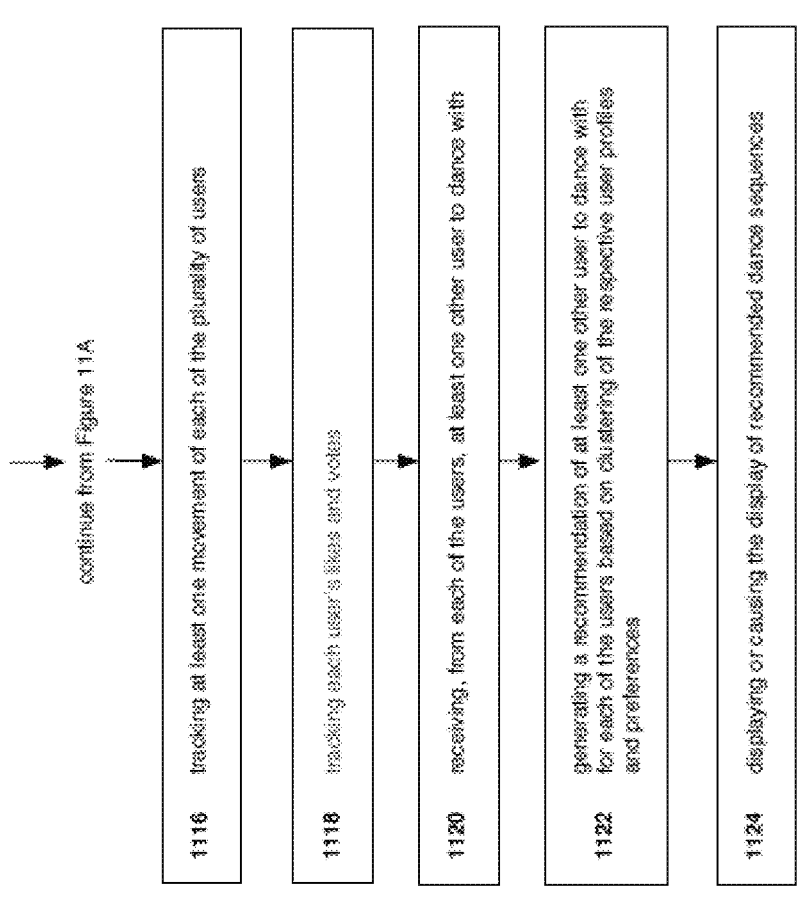

continue from Figure 11A 1116    tracking at least one movement of each of the plurality of users 1118    tracking each user's likes and votes 1120    receiving, from each of the users, at least one other user to dance with 1122    generating a recommendation of at least one other user to dance with for each of the users based on clustering of the respective user profiles and preferences 1124    displaying or causing the display of recommended dance sequences

1302 Data Processing System

1326 In-Line Accelerator

1304 Memory

1306 Static Memory

1322 Network Interface Device

1318 Network

1328 Voice User Interface

1308 Interconnect

1310 Video Display

1312 User Input Device

1314 Camera

1320 Graphic User Interface

1316 Data Storage Device

1324 RF Transceiver

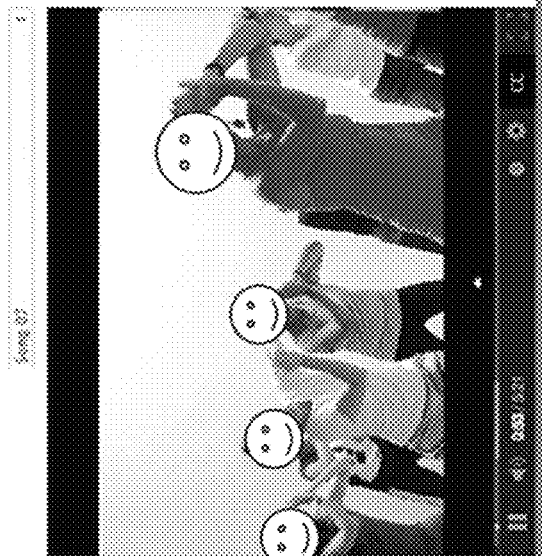
Figure 14

METHOD AND SYSTEM FOR MUSIC AND DANCE RECOMMENDATIONS

RELATED APPLICATIONS AND INCORPORATION BY REFERENCE

This application is a continuation-in-part application of copending U.S. patent application Ser. No. 16/900,883, filed Jun. 13, 2020, filed Jun. 13, 2020, which claims priority to U.S. Provisional Patent Application No. 62/860,957, filed Jun. 13, 2019, the entire contents of which are incorporated herein by reference.

The foregoing applications, and all documents cited therein or during their prosecution ("appln cited documents") and all documents cited or referenced in the appln cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention. More specifically, all referenced documents are incorporated by reference to the same extent as if each individual document was specifically and individually indicated to be incorporated by reference.

FEDERAL FUNDING LEGEND

This invention was made with government support under Grant No. R43MD018300 awarded by National Institute on Minority Health and Health Disparities. The government has certain rights in the invention.

FIELD OF THE INVENTION

The invention relates generally to a method and system for providing users with personalized recommendations for music and dance.

BACKGROUND OF THE INVENTION

Behavior change is a big challenge in the healthcare industry. Research has shown that many health impaired people know the benefits of exercise but don't do it, because even though they have both the ability and motivation for exercise, they do not have a "trigger"-a reason to shift into an exercise mode. Music, used for centuries to reduce stress and anxiety, is also a natural trigger for dance.

SUMMARY OF THE INVENTION

In accordance with various embodiments of the invention, this disclosure provides a method and system for providing users suffering from a disease with personalized recommendations for music and dance to improve their physical condition, mood, and emotional well-being. Generally, provided is an improved method and system for recommending dance sequences based on user preferences and other data, tailored to their needs.

The invention in various embodiments relates to a computer-implemented method for providing a plurality of users with an environment for personalized dance activities, the method comprising: generating a plurality of dance sequences; associating or causing the association of each of the plurality of dance sequences with at least one dance corpus classification; generating, for each of the plurality of users, a user profile; receiving, from each of the plurality of users, at least one preference data; associating or causing the association of each of the user's profile with the at least one preference data; and generating a recommendation of a dance sequence for each of the plurality of users.

The invention in various embodiments relates a system for providing a plurality of users with an environment for personalized dance activities, the system comprising: at least one computer including at least one processor, the at least one computer in communication with at least one data storage unit, the at least one computer programmed and/or configured to: generate a plurality of dance sequences; associate or cause the association of each of the plurality of dance sequences with at least one dance corpus classification; generate, for each of the plurality of users, a user profile; receive, from each of the plurality of users, at least one preference data; associate or cause the association of each of the user's profile with the at least one preference data; and generate a recommendation of a dance sequence for each of the plurality of users.

According to one aspect of the present invention, the present invention provides a method for improving physical condition or mood of a subject suffering from a disease through personalized dance activity, and for building a subject data base, and for building a subject data set comprising providing a subject with a system, said system comprising:

at least one computer including at least one processor,
  at least one data storage unit coupled to the at least one processor,
    said data storage unit including:
    the subject data base containing subject data base information and tracking information from the subject,
      wherein said subject data base information comprises unique user identifier information, demographic data, preference data, historical data, lifestyle data, real-time situational data, and real-time mood data, and
      wherein said tracking information comprises facial recognition data from the subject and physiological measurements of the subject from tracking information collection devices and comprising skeletal tracking data, or thermal tracking data, or oxygenation circulatory tracking data,
    the subject data set comprising subject data base information and tracking information from a plurality of users of the system, and
    a repository of live video classes or recorded dance videos, and
  the tracking information collection devices associated with the subject comprising an input device, a camera, and biosensor peripheral device(s) worn by the subject that communicate with the processor,
wherein:
  the system initiates and initially builds the subject data base by initially collecting subject data base information and tracking information via the tracking information collection devices from the subject initiating use of the system,
  the system analyzes and interprets the subject data base information and tracking information and makes determinations as to the subject's physiological state and mood and generates from data comprising the subject data base information and the tracking information, the determinations as to the subject's physiological state and mood, the repository of live video classes or recorded dance videos, and the subject data set, a selection of dance routines for the subject, the system presents to the subject the selection of dance routines, the system accepts from the subject the subject's selected dance routine, the system presents to the subject a recorded dance video or live video classes corresponding to the subject's selected dance routine, the system collects subject data base information and tracking information via the tracking information collection devices when the subject executes the subject's selected dance routine and engages in the personalized dance activity, and at the conclusion of the subject executing the subject's selected dance routine and engaging in the personalized dance activity, the system analyzes and interprets the subject data base information and tracking information from when the subject executes the subject's selected dance routine and engages in the personalized dance activity, and at the conclusion of the subject executing the subject's selected dance routine and engaging in the personalized dance activity, and makes determinations as to the subject's physiological state and mood, whereby the system tracks improvement in the subject's physiological state and mood and refines its ability to generate and present dance routine selections for the subject in each subsequent use by the subject, the system builds the subject data set by adding the subject data base information and tracking information to the subject data set, and the system continues to build the subject data base and the subject data set with each subsequent use of the system by the subject by collecting subject data base information and tracking information via the tracking information collection devices from each subsequent use of the system by the subject, and adding that subsequent use subject data base information and tracking information to the subject data set, and the subject has initial use of the system and has at least one subsequent use of the system, wherein, in the initial use of the system, the system receives subject data base information and tracking information of the subject from the tracking information collection devices and, initiates and initially builds the subject data base from the subject initiating use of the system, the system analyzes and interprets the subject data base information and tracking information and makes first determinations as to the subject's physiological state and mood and generates from data comprising the subject data base information and the tracking information, the determinations as to the subject's physiological state and mood, the repository of live video classes or recorded dance videos, and the subject data set, a first selection of dance routines for the subject, the system presents to the subject the first selection of dance routines, the system accepts from the subject the subject's first selected dance routine, the system presents to the subject a dance video corresponding to the subject's first selected dance routine, the system collects subject data base information and tracking information via the tracking information collection devices when the subject executes the subject's first selected dance routine and engages in the personalized dance activity, and at the conclusion of the subject executing the subject's first selected dance routine and engaging in the personalized dance activity, the system analyzes and interprets the subject data base information and tracking information from when the subject executes the subject's first selected dance routine and engages in the personalized dance activity, and at the conclusion of the subject executing the subject's first selected dance routine and engaging in the personalized dance activity, and makes first determinations as to the subject's physiological state and mood, whereby the system tracks improvement in the subject's physiological state and mood and refines its ability to generate and present dance routine selections for the subject in each subsequent use by the subject, the system builds the subject data set by adding the subject data base information and tracking information to the subject data set, in each subsequent use of the system, the system receives subject data base information and tracking information of the subject from the tracking information collection devices and, builds the subject data base from the subject's subsequent use of the system, the system analyzes and interprets the subject data base information and tracking information and makes determinations as to the subject's physiological state and mood and generates from data comprising the subject data base information and the tracking information, including from the subject's earlier use of the system, the determinations as to the subject's physiological state and mood, the repository of live video classes or dance videos, and the subject data set, a second selection of dance routines for the subject, the system presents to the subject the second selection of dance routines, the system accepts from the subject the subject's second selected routine, the system presents to the subject a dance video corresponding to the subject's second selected dance routine, the system collects subject data base information and tracking information via the tracking information collection devices when the subject executes the subject's second selected dance routine and engages in the personalized dance activity, and at the conclusion of the subject executing the subject's second selected dance routine and engaging in the personalized dance activity, the system analyzes and interprets the subject data base information and tracking information from when the subject executes the subject's second selected dance routine and engages in the personalized dance activity, and at the conclusion of the subject executing the subject's second selected dance routine and engaging in the personalized dance activity, and from that subject data base information and tracking information and from the subject's earlier use of the system, the system makes determinations as to the subject's physiological state and mood, whereby the system tracks improvement in the subject's physiological state and mood and refines its ability to generate and present dance routine selections for the subject in each subsequent use by the subject, and the system builds the subject data set by adding the subject data base information and tracking information from each subsequent use to the subject data set, whereby there is improving of the physical condition or mood of the subject through personalized dance activity, and there is building of the subject data base, and building of the subject data set.

In another embodiment, the disease is pre-diabetes, diabetes mellitus, hypertension, cardiovascular disease, a cancer, a neurological disorder, or a mental illness.

In another embodiment, the neurological disorder is Alzheimer's disease or an Alzheimer's disease related dementia (ADRD).

In another embodiment, the tracking information collection devices associated with the subject further comprises a Voice User Interface (VUI), wherein the VUI is configured to receive audio data from the subject and to communicate with the processor, wherein the audio data comprises the subject's voice.

In another embodiment, the tracking information further comprises the subject's mood or stress level obtained from audio data.

In another embodiment, the voice user interface provides audio feedback to the subject after receiving the audio data and communication with the processor.

In another embodiment, the voice user interface is configured to receive audio data in a non-English language.

In another embodiment, the voice user interface provides audio feedback to the subject after receiving the audio data and communication with the processor, wherein the audio feedback is in the non-English language.

In another embodiment, the tracking information comprises tracking of emotions of the subject before, during and after dance, or duration of dance.

In another embodiment, the system comprises subject data base information as to a plurality of subjects, and the subject data set comprises information as to a plurality of users of the computer system.

In another embodiment, in generating the selection of dance routines, the system additionally analyzes the subject data set and matches the subject with at least one buddy who is one of the plurality of users of the system, and presents the at least one buddy to the subject with the selection of dance routines, the system accepts from the subject the subject's selected dance routine and selection of the buddy, and system presents to the subject and the buddy the subject's selected dance routine, whereby the system provides for the subject and the buddy performing together the subject's selected dance routine.

In another embodiment, the system additionally analyzes the subject data set and matches the subject with a teacher who is one of the plurality of users of the system, and presents the teacher to the subject with the selection of dance routines, the system accepts from the subject the subject's selected dance routine and selection of the teacher, and the system presents to the subject and the teacher the subject's selected dance routine, whereby the system provides for the subject and the teacher performing together the subject's selected dance routine.

In another embodiment, the physiological measurements of the subject and the teacher comprise skeletal tracking data, and the system compares the subject skeletal tracking data and the teacher skeletal tracking data and communicates to the subject whether the subject is matching movement of the teacher for the subject's selected dance routine.

According to another aspect of the invention, the present invention provides for a system for improving physical condition or mood of a subject through personalized dance activity, and for building a subject data base, and for building a subject data set comprising providing a subject with a system, said system comprising:

at least one computer including at least one processor, at least one data storage unit coupled to the at least one processor, said data storage unit including:

the subject data base containing subject data base information and tracking information from the subject, wherein said subject data base information comprises unique user identifier information, demographic data, preference data, historical data, lifestyle data, real-time situational data, and real-time mood data, and wherein said tracking information comprises facial recognition data from the subject and physiological measurements of the subject from tracking information collection devices and comprising skeletal tracking data, or thermal tracking data, or oxygenation circulatory tracking data, the subject data set comprising subject data base information and tracking information from a plurality of users of the system, and a repository of live video classes or recorded dance videos, and the tracking information collection devices associated with the subject comprising an input device, a camera, and biosensor peripheral device(s) worn by the subject that communicate with the processor, wherein:

the system initiates and initially builds the subject data base by initially collecting subject data base information and tracking information via the tracking information collection devices from the subject initiating use of the system, the system analyzes and interprets the subject data base information and tracking information and makes determinations as to the subject's physiological state and mood and generates from data comprising the subject data base information and the tracking information, the determinations as to the subject's physiological state and mood, the repository of live video classes or recorded dance videos, and the subject data set, a selection of dance routines for the subject, the system presents to the subject the selection of dance routines, the system accepts from the subject the subject's selected dance routine, the system presents to the subject a recorded dance video or live video classes corresponding to the subject's selected dance routine, the system collects subject data base information and tracking information via the tracking information collection devices when the subject executes the subject's selected dance routine and engages in the personalized dance activity, and at the conclusion of the subject executing the subject's selected dance routine and engaging in the personalized dance activity, the system analyzes and interprets the subject data base information and tracking information from when the subject executes the subject's selected dance routine and engages in the personalized dance activity, and at the conclusion of the subject executing the subject's selected dance routine and engaging in the personalized dance activity, and makes determinations as to the subject's physiological state and mood, whereby the system tracks improvement in the subject's physiological state and mood and refines its ability to generate and present dance routine selections for the subject in each subsequent use by the subject, the system builds the subject data set by adding the subject data base information and tracking information to the subject data set, and the system continues to build the subject data base and the subject data set with each subsequent use of the system by the subject by collecting subject data base information and tracking information via the tracking information collection devices from each subsequent use of the system by the subject, and adding that subsequent use subject data base information and tracking information to the subject data set.

In another embodiment, the tracking information of the system further comprises the subject's mood obtained from audio data.

In another embodiment, the voice user interface provides audio feedback to the subject after receiving the audio data and communication with the processor.

In another embodiment, the voice user interface is configured to detect a change or deviation from the user's baseline voice, wherein the change or deviation comprises one or more changes in phonation, pitch, loudness, and rate In another embodiment, the voice user interface is configured to receive audio data in a non-English language.

In another embodiment, the voice user interface provides audio feedback to the subject after receiving the audio data and communication with the processor, wherein the audio feedback is in the non-English language.

In another embodiment, the subject data base information analyzed by the system includes at least one preference data, wherein the at least one preference data includes favorite music to generate the selection of dance routines for the subject.

Accordingly, it is an object of the invention not to encompass within the invention any previously known product, process of making the product, or method of using the product such that Applicants reserve the right and hereby disclose a disclaimer of any previously known product, process, or method. It is further noted that the invention does not intend to encompass within the scope of the invention any product, process, or making of the product or method of using the product, which does not meet the written description and enablement requirements of the USPTO (35 U.S.C. § 112, first paragraph) or the EPO (Article 83 of the EPC), such that Applicants reserve the right and hereby disclose a disclaimer of any previously described product, process of making the product, or method of using the product. It may be advantageous in the practice of the invention to be in compliance with Art. 53(c) EPC and Rule 28(b) and (c) EPC. All rights to explicitly disclaim any embodiments that are the subject of any granted patent(s) of applicant in the lineage of this application or in any other lineage or in any prior filed application of any third party is explicitly reserved. Nothing herein is to be construed as a promise.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

These and other embodiments are disclosed or are obvious from and encompassed by, the following Detailed Description.

BRIEF DESCRIPTION OF THE DRAWINGS

The following detailed description, given by way of example, but not intended to limit the invention solely to the specific embodiments described, may best be understood in conjunction with the accompanying drawings.

FIG. 7 illustrates examples of user interfaces provided by a platform of the present design.

FIGS. 11A and 11B illustrate a method for providing a plurality of users with an environment for personalized dance activities.

FIG. 14 shows an exemplary display interface of the system.

DETAILED DESCRIPTION OF THE INVENTION

Figure 1:
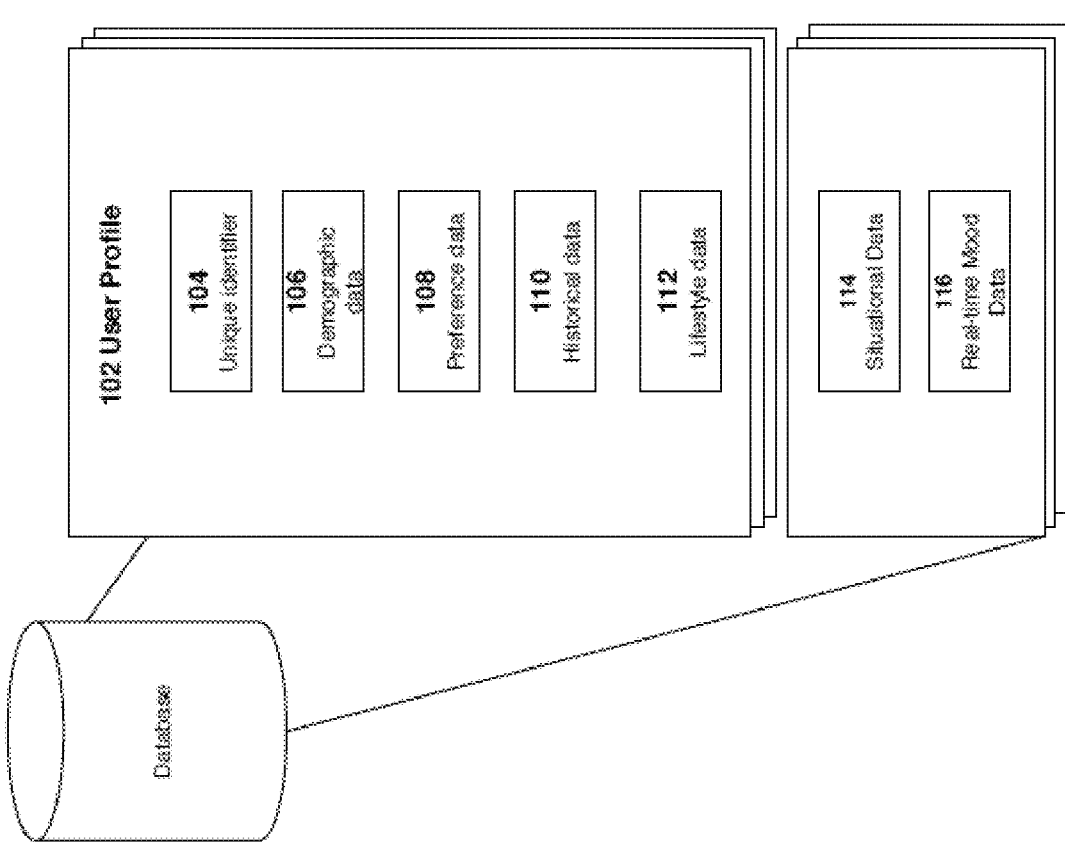
FIG. 1 is a block diagram of a user profile database according to the principles of the present invention.

In various embodiments, described in enabling detail below, the invention provides an ecosystem comprised of applications, a community-building platform, hardware sensors, and peripheral components, to quantify, analyze, and interpret both physiological biometric data and mood data in a manner that enables the user to engage in dance as a healing modality.

Diseases such as pre-diabetes, hypertension, diabetes mellitus, cardiovascular disease, cancer, and neurological disorders affect older and elderly populations at higher rates and such diseases ultimately affect the quality of life of the subject, who may be experiencing pain or other adverse effects of the diseases and can no longer carry out daily tasks or enjoy daily life. Such diseases also disproportionally affect minority communities that may face additional barriers in seeking medical care. Dancing frequently reduces the risk of cardiovascular death by 46%. Merom et al., "Dancing Participation and Cardiovascular Disease Mortality." American Journal of Preventive Medicine, vol. 50, no. 6, 2016, pp. 756-760. Dance also reduces the risk of developing dementia by 76%, improves balance by 50%, and reduces fall risk in the elderly. Hwang et al., "The Effectiveness Of Dance Interventions To Improve Older Adults' Health: A Systematic Literature Review.". *Alternative Therapies In Health And Medicine*, vol 21, no. 5, 2015, pp. 64-70. Dance has also improved the quality of life in cancer patients by approximately 50% and reduces pain by approximately 59%. Puetz et al., "Effects Of Creative Arts Therapies On Psychological Symptoms And Quality Of Life In Patients With Cancer". *JAMA Internal Medicine*, vol 173, no. 11, 2013, p. 960. In various embodiments, the invention relates to methods for improving physical condition or mood of a subject suffering from a disease, which may include, for example, pre-diabetes, hypertension, diabetes mellitus, cardiovascular disease, a cancer, or a neurological disorder such as Alzheimer's disease, through personalized dance activity, and for building a subject data base, and for building a subject data set comprising providing a subject with a system that generates a selection of dance routines for the subject based on analyzing subject data base information and tracking information and determinations as to the subject's physiological state and mood. This system serves to provide access to a system for these older and aging communities that may face additional barriers in seeking medical care to improve their health and mood and lower the risk of developing a chronic disease.

An individual's voice characteristics such as phonation, pitch, loudness, and rate can provide indication as to the individual's mood and deviations from a baseline voice may be indications of early onset dementia. In some embodiments, this includes a voice user interface that is configured to receive audio data from a user and communicate with a processor, wherein the user's mood can be determined based on the audio data received by the voice user interface. In some embodiments, the audio data is gathered through recording of the user's voice during use of the platform. In some embodiments, the voice user interface is configured to detect a change or deviation from the user's baseline voice, wherein the change or deviation comprises one or more changes in phonation, pitch, loudness, and rate, and wherein the system generates an alert based on the audio data received with respect to the change or deviation in the user's voice.

Cardiovascular disease, cancer, and dementia, such as Alzheimer's disease, are among the leading causes of death in the United States. In 2021, there were approximately 173.8 deaths per 100,000 U.S. standard population from heart disease, which is the leading cause of death in the United States. Cancer is the second leading cause of death, with approximately 146.6 deaths per 100,000 U.S. standard population. There were approximately 31.0 deaths per 100,000 U.S. standard population from Alzheimer's disease, the seventh ranked leading cause of death. Xu et al., Mortality in the United States, 2021, NCHS Data Brief No. 456, December 2022.

Cardiovascular disease (CVD) is the general term for heart and blood vessel diseases, including atherosclerosis, coronary heart disease, cerebrovascular disease, aorto-iliac disease, and peripheral vascular disease. Subjects with CVD may develop a number of complications, including, but not limited to, myocardial infarction, stroke, angina pectoris, transient ischemic attacks, congestive heart failure, aortic aneurysm and death. CVD is the leading cause of death in the United States. Centers for Disease Control and Prevention, Heart Disease, https://www.cdc.gov/heartdisease/facts.htm. Thus, prevention of cardiovascular disease is an area of major public health importance.

A low-fat diet and exercise are recommended to prevent CVD. In addition, a number of therapeutic agents may be prescribed by medical professionals to those individuals who are known to be at risk for developing or having CVD. These include lipid-lowering agents that reduce blood levels of cholesterol and trigylcerides, agents that normalize blood pressure, agents, such as aspirin or platelet ADP receptor antatoginist (e.g., clopidogrel and ticlopidine) that prevent activation of platelets and decrease vascular inflammation, and pleotrophic agents such as peroxisome proliferator activated receptor (PPAR) agonists, with broad-ranging metabolic effects that reduce inflammation, promote insulin sensitization, improve vascular function, and correct lipid abnormalities. More aggressive therapy, such as administration of multiple medications or surgical intervention may be used in those individuals who are at high risk. Since CVD therapies may have adverse side effects, it is desirable to have methods for identifying those individuals who are at risk, particularly those individuals who are at high risk, of developing or having CVD.

Currently, several risk factors are used by medical professionals to assess an individual's risk of developing or having CVD and to identify individuals at high risk. Major risk factors for cardiovascular disease include age, hypertension, family history of premature CVD, smoking, high total cholesterol, low HDL cholesterol, obesity and diabetes.

The CDC has reported that 96 million Americans aged 18 years or older have pre-diabetes and 37.3 million Americans have diabetes mellitus (DM). Centers for Disease Control and Prevention, National Diabetes Statistics Report, https://www.cdc.gov/diabetes/data/statistics-report/index.html. These populations are at risk for developing CVD and other complications, which include, but are not limited to gastroparesis, retinopathy, ulcers, gum disease, hearing loss, kidney disease, hypertension, liver disease, peripheral neuropathy, sexual dysfunction, stroke and urinary tract infections. Sixty-eight percent of people aged 65 or older died from cardiovascular disease. Subjects suffering from DM do not produce enough insulin to help glucose enter the cell or the body does not respond to the insulin produced (insulin resistance), resulting in elevated blood sugar levels. Among this population, approximately 13.5 million are over the age of 65. Centers for Disease Control and Prevention. "Health And Economic Costs Of Chronic Diseases" cdc.gov 2021; American Diabetes Association. "The Cost Of Diabetes", Diabetes.org, 2021. Most patients with DM die from CVD. American Heart Association. *Diabetes*, American Heart Association, 2013. Approximately 85.6 million Americans, or one in three Americans, have at least one CVD, of which, approximately 43.7 million are aged 60 or older. American Heart Association. *Older Americans & Cardiovascular Diseases*. American Heart Association, 2016. The Centers for Disease Control and Prevention has reported that DM disproportionately affects minority communities. Thus, there is a need to bring affordable healthcare to these groups. Centers for Disease Control and Prevention. "Addressing Health Disparities in Diabetes.", Aug. 10, 2021.

While a subject's weight and body mass index can contribute as a risk factor in the development of DM or other forms of diabetes, DM can develop in those of normal weight or body mass index. Currently, there is a lack of data on effective lifestyle recommendations for normal-weight diabetics (NWD). NWDs account for approximately 1 in 5 Type II DM patients and is especially prevalent in Asian populations and the elderly, facing higher mortality rates than obese diabetics. People of Asian descent often develop diabetes at a younger age and lower body weight. Centers for Disease Control and Prevention. "Diabetes and Asian Americans" cdc.gov, Aug. 25, 2021. Filipinos, Koreans, South Asians, and Vietnamese adults are likely to be diagnosed with type 2 diabetes significantly earlier than non-Hispanic white adults. Centers for Disease Control and Prevention, "Disparities in Age at Diabetes Diagnosis Among Asian Americans: Implications for Early Preventive Measures" cdc.gov, Sep. 10, 2015. Furthermore, the prevalence of high blood pressure (HBP) in African Americans is the highest globally. Greater than 40% of African Americans have HBP, which can contribute to an increased risk for developing DM or other complications such as Alzheimer's disease. American Heart Association, "High Blood Pressure and African Americans.". Additionally, HBP increases the risk of heart disease and stroke. US Dept. of Health and Human Services—The Office of Minority Health, "Diabetes and African Americans". DM is more common among African-Americans than non-Hispanic whites and is a significant risk factor for CVD.

Cancer is a broad term for a multitude of diseases resulting from the abnormal and uncontrollable growth of the body's cells, which can metathesize or spread to other parts of the body, disrupting bodily function. This can result in a host of symptoms, which include, but are not limited to, pain, fatigue, abnormal lumps, abnormal bowel habits, abnormal diarrhea and constipation, blood in the stool or urine, sores, ulcers, indigestion, persistent headaches or migraines, seizures, and vertigo.

Examples of cancers include, but are not limited to melanoma, renal cancer, prostate cancer, breast cancer, colon cancer and lung cancer, bone cancer, pancreatic cancer, skin cancer, cancer of the head or neck, cutaneous or intraocular malignant melanoma, uterine cancer, ovarian cancer, rectal cancer, cancer of the anal region, stomach cancer, testicular cancer, carcinoma of the fallopian tubes, carcinoma of the endometrium, carcinoma of the cervix, carcinoma of the vagina, carcinoma of the vulva, Hodgkin's Disease, non-Hodgkin's lymphoma, cancer of the esophagus, cancer of the small intestine, cancer of the endocrine system, cancer of the thyroid gland, cancer of the parathyroid gland, cancer of the adrenal gland, sarcoma of soft tissue, cancer of the urethra, cancer of the penis, chronic or acute leukemias including acute myeloid leukemia, chronic myeloid leukemia, acute lymphoblastic leukemia, chronic lymphocytic leukemia, solid tumors of childhood, lymphocytic lymphoma, cancer of the bladder, cancer of the kidney or ureter, carcinoma of the renal pelvis, neoplasm of the central nervous system (CNS), non-small cell lung cancer (NSCLC), primary CNS lymphoma, tumor angiogenesis, spinal axis tumor, brain stem glioma, pituitary adenoma, Kaposi's sarcoma, epidermoid cancer, squamous cell cancer, T-cell lymphoma, B-cell lymphomas, multiple myeloma, and environmentally induced cancers including those induced by asbestos (e.g., mesothelioma).

Subjects suffering from a cancer and receiving treatment may also experience adverse side effects from the treatment, which include, but are not limited to, neutroprenia, lymphedema, hair loss, nausea and vomiting, trouble with concentration or memory issues (chemo brain), pain, and deep vein thrombosis. Subject may also feel fatigued and may suffer from lost appetite during treatment. Subjects may also suffer from depression post-diagnosis of the cancer or during treatment.

While cancer affects subjects of all ages, races and ethnicities, and socioeconomic classes, there are disparities among population groups with respect to the incidence and mortality rates with respect to cancer. This is especially prevalent in minority communities that may encounter more obstacles in seeking health care, which include, but are not limited to low income, low health literacy, distance from nearest medical facility to seek evaluation and treatment, lack of transportation, lack of health insurance, and lack of paid sick or medical leave in their careers. Black and African-Americans experience a higher death rate than all other racial and ethnic groups for many cancers. For example, despite having similar rates of breast cancer, African-American women have a higher likelihood of dying of breast cancer. African-American men, already having the highest mortality rate from prostate cancer, are twice as likely to die of prostate cancer than White men. Hispanic and Latino and Black and African-American women have higher rates of cervical cancer than other racial and ethnic groups and African-American women experience the highest rate of mortality from cervical cancer. American indigenous populations (American Indians, Alaska natives) experience higher death rates from kidney cancer than other racial or ethnic groups. National Cancer Institute, Cancer Disparities, https://www.cancer.gov/about-cancer/understanding/disparities/

Neurological disorders include chronic neurodegeneration, acute neurodegeneration, neuropsychiatric indications, and mental illnesses. Examples of chronic neurodegeneration include, but are not limited to Alzheimer's disease, frontotemporal dementia, chronic traumatic encephalopathy, tauopathies, Parkinson's and alpha-synucleopathies, prion disease, transmissible spongiform encephalopathies (TSE), Down Syndrome, Huntington's disease, amyotrophic lateral sclerosis, multiple sclerosis, other dementias and neurodegenerative disorders which present as misfolding, aggregation and accumulation of proteins in the brain, resulting in axonal transport impairment, inflammation, and eventual cell death. Examples of acute neurodegeneration include, but are not limited to traumatic brain injury, stroke, acute brain injury induced by brain ischemia, acute brain injury induced by insufficient oxygen supply to the brain, acute brain injury induced by anoxia or hypoxia, micro infarcts, acute brain injury induced by concussion, post-operative cognitive decline resulting from anesthesia or surgery-induced inflammation, acute brain injury induced by drowning, acute brain injury associated with whip lash, acute brain injury associated with bicycle crashes, acute brain injury associated with automobile accidents, shaken baby syndrome, acute brain injury induced by falling, acute brain injury associated with physical impact of the head, and acute angle-closure glaucoma. Examples of neuropsychiatric indications include, but are not limited to depression, schizophrenia, dementia, Alzheimer's disease, anxiety, and substance abuse disorder. Examples of mental illnesses include, but are not limited to autism, attention deficit-hyperactivity disorder, bipolar disorder, depression and major depressive disorder, behavioral problems, posttraumatic stress disorder and schizophrenia.

Dementia is a form of chronic neurodegeneration that generally relates to the decline in a subject's cognitive abilities, in particular, with memory, thinking, and behavior. Often, subjects suffering from a form of dementia lose the ability to do everyday activities. While the onset of dementia can occur at any age, dementia tends to affect the elderly.

The most common form of dementia is an Alzheimer's-Disease-Related Dementias (ADRD), which includes Alzheimer's disease. Other ADRDs include, but are not limited to Alzheimer's disease, Parkinson's disease dementia, and related maladies in humans involving cognitive and behavioral dysfunction such as Lewy body dementia. Most are chronic neurodegenerative disorders of the human central nervous system (CNS) characterized by progressive cognitive impairment, a variety of neurobehavioral and/or neuropsychiatric disturbances, and restrictions in activities of daily living. Approximately 17.5% of rural Americans are 65+, compared to 13.8% in urban areas, face worse disparities in ADRD-related care access. Smith et al., US Department of Commerce, Economics and Statistics Administration, The older population in rural America: 2012-2016; Rahman et al., Assessment of Rural-Urban Differences in Health Care Use and Survival Among Medicare Beneficiaries With Alzheimer Disease and Related Dementia. JAMA Network Open 2020. African-Americans and Hispanics have two times and one and a half times, respectively, higher odds, of developing AD than Caucasians but are underrepresented in ADRD clinical trials. Alzheimer's Association, 2022 Alzheimer's Disease Facts and Figures. Minorities and economically disadvantaged groups have less access to preventative care resources and treatment. Over 50 million unpaid family caregivers provide billions of hours of care annually, facing financial, emotional, and career disruption. 13. AARP 2020 Research Report: Caregiving in the US. The lack of effective treatments and cures significantly burdens healthcare systems and caregiving. The COVID-19 pandemic's long-lasting impact has also contributed to increased social isolation and mortality rates. Thus, there is a need to increase connectedness and activity engagement and improve the effectiveness of ADRD treatments in minority communities such as in Hispanic and Latino communities. For example, in Hispanic and Latino communities, one challenge is being able to engage with Spanish-speaking older Latino adults, who may be suffering from ADRD, with respect to cultural sensitivity and overcoming a language barrier. Thus there is the need to develop an interface having a culturally-sensitive algorithm and language translation or multilingual capabilities to improve engagement among this population.

In 2022, approximately 6.5 million Americans are affected by ADRD and this is projected to reach 13.8 million by 2060. Alzheimer's Association, 2022 Alzheimer's Disease Facts and Figures. Two in three patients and 60% of caregivers women. Id.; Mazure et al., Sex differences in Alzheimer's disease and other dementias, The Lancet. Neurology 2016, 15 (5), p. 451. Many homebound ADRD patients suffer from cognitive impairment, social isolation, and loneliness, causing anxiety and depression. Alzheimer's Disease (AD) affects 1 in 9 Americans over 65 and 1 in 3 over 85 years of age. Alzheimer's Association, 2022 Alzheimer's Disease Facts and Figures. In 2021, AD care costs totaled approximately $355 billion; by 2050, AD care costs are estimated to total $1.5 trillion. Alzheimer's Association Report, 2021 Alzheimer's Disease Facts and Figures, Alzheimer's & Dementia 2021; Bartoletti, M., CareGivers America, Alzheimer's costs could hit Alzheimer's costs could hit $1.5 trillion a year by 2050, study says, Nov. 5, 2021.

Lesbian, gay, bisexual, transgender and queer/questioning individuals tend to experience harsher treatment from peers, family and society, especially during their teenage years. According to the Gay, Lesbian and Straight Education Network's (GLSEN) 2015 National School Climate Survey School Climate Report, approximately 85% of LGBTQ youth have been verbally abused, 27% have been physically bullied, and 13% have been physically bullied. during high school (Kosciw, Greytak, Giga, Villenas, & Danischewski, 2016). Of these incidents of abuse or bullying, almost 58% of victims did not discuss the incident with school officials because they felt no one would intervene on their behalf, and 64% of victims who reported abuse were ignored (Kosciw et al., 2016). 94 percent of participants in a community study experienced violence against their sexual orientation (Mustanski, Andrews, & Puckett, 2016).

LGBTQIA+youth experience more mental health disorders than their cisgender and heterosexual peers. 30 percent of LGBTQIA+youth have experienced clinically significant mental health disorders such as anxiety, depression, post-traumatic stress disorder (PTSD), and nearly 32 percent of LGBTQIA+youth have attempted suicide (Mustanski and Liu, 2013; Mustanski et al., 2016). Additionally, Ray and Berger (2007) estimate that 20-40% of homeless youth identify as LGBTQIA+ (Snyder et al., 2016). Homeless LGBTQIA+youth are at increased risk of sexual abuse and victimization because they often use survival sex to ensure their safety while homeless, with significant psychological consequences (Keuroghlian, Shtasel, & Bassuk, 2014; Rew, Whittaker, Taylor-Seehafer and Smith, 2005).

Mental health and well-being are an invaluable part of self-development, fostered by the social support of community, friends and family (Harter and Bukowski, 2012; Rigby, 2000). Adolescents need positive and supportive relationships throughout their cognitive and social development to build positive self-awareness that leads to successful adjustment in adolescence and beyond (Vieno, Santinello, Pastore, & Perkins, cited 2007). When youth struggle with self-efficacy, growth and development, problematic transitions such as illicit drug use, depression, anxiety and undesirable social behaviors can result (Hutchinson et al., cited 2016). Disparities in mental health, sexually transmitted diseases, and violence among the LGBTQIA+ population also continue to grow, raising concerns about the healthy maturation of LGBTQIA+youth (e.g., Mustanski and Liu, 2013). Russell and Fish (2016) state that " . . . changes in societal acceptance of LGBTQIA+people have allowed today's youth to emerge, but the coming-out era now coincides with a phase of development characterized by potentially intense gender and social regulation. sexuality, including of homophobia" (page 3). Therefore, social support becomes important in the development of a young person's sense of self, and is particularly important for LGBTQIA+youth, who typically experience more stress and violence during their youth.

In addition, the lack of social support associated with bullying and repeated victimization is associated with negative outcomes such as increased dropout rates and decreased participation rates in higher education (Kosciw, Gretak, Palmer, & Boesen, 2014). While researchers continue to work to identify the needs of these young people, there is a worrying lack of knowledge about effective interventions to support mental health and reduce bullying and victimization. Current research focuses more on risky sexual behavior (i.e., rates of condom use) or sexual health, mental health status, and bullying/victimization, rather than interventions that might lead to recovery among LGBTQIA+youth (e.g., Elze, Citation2002; Ybarra, Rosario; Saewyc, & Goodenow, 2016). Thus, there is a need for mental health support among LGBTQIA+youth and their families, a population that experiences higher rates of mental health illnesses disorders, victimization, and discrimination. Examples of mental illnesses include, but are not limited to autism, attention deficit-hyperactivity disorder, bipolar disorder, depression and major depressive disorder, behavioral problems, post-traumatic stress disorder and schizophrenia.

According to the American Psychological Association 2022 report, 76 percent of Americans experienced impacts on their health due to stress in the month prior to the survey. More specifically, about one-third of adults said they had experienced feeling nervous or anxious (34 percent), depressed or sad (33 percent), and fatigue (35 percent) as a result of their stress levels. Approximately fifteen percent of adults resorted to using alcohol, cigarettes, or drugs to relax and manage stress. American Psychological Association, Stress in America 2022, https://www.apa.org/news/press/releases/stress/2022/concerned-future-inflation.

Published medical studies reveal dance improves both physical and emotional well-being, and provide substantial neurological benefits. Dancing frequently reduces the risk of cardiovascular death by 46%. Merom et al., "Dancing Participation and Cardiovascular Disease Mortality." American Journal of Preventive Medicine, vol. 50, no. 6, 2016, pp. 756-760. Dance also reduces the risk of developing dementia by 76%, improves balance by 50%, and reduces fall risk in the elderly. Hwang et al., "The Effectiveness of Dance Interventions To Improve Older Adults' Health: A Systematic Literature Review.". *Alternative Therapies In Health And Medicine*, vol 21, no. 5, 2015, pp. 64-70. Dance has also improved the quality of life in cancer patients by approximately 50% and reduces pain by approximately 59%. Puetz et al., "Effects of Creative Arts Therapies On Psychological Symptoms And Quality Of Life In Patients With Cancer". *JAMA Internal Medicine*, vol 173, no. 11, 2013, p. 960. Dance/movement therapy, especially synchronized movement to rhythm, is highly effective not only for physical well-being, but more importantly, for emotional well-being as dance has been shown to increase happiness, affection, and contentment. Greater Good Science Center, Dance for Your DOSE of Happiness and Health 2019. Dance/movement therapy is more broadly effective than physical therapy and other exercises; dance increases oxytocin, serotonin, and decreases dopamine, resulting in a more euthymic brain. Hand/finger dances/exercises help people with restricted movements by promoting neuroplasticity in the brain, increasing motor skills, brain synapsing efficiency, balance, coordination, and timing. Thus, while dance has been shown to improve cognitive function, reduce the risk of death by CVD, reduce pain, and provide an overall improvement in the quality of life of patients, there is the lack of accessible platforms for at-home or on the go adoption to meet an individual's mobility and accessibility needs.

There are prior approaches for artificial intelligence and recommendation systems for related applications. Music recommendation systems are based on four broad categories of inputs for their recommendations: (1) metadata such as genre, album, artist, etc. (2) acoustic terms such as rhythm, beats, melody, etc.; (3) direct feedback from the users such as a rating of mood, likes, dislikes, biometrics etc.; and (4) collaborative feedback such as information listening patterns. Current music recommendations use the four inputs above in a weighted system to make a recommendation. There is a prior approach for personalized exercise programs, but it does not consider dance to be an exercise to recommend. There is a prior approach to recognize when a person is dancing, but it is not used for recommendations. No system exists for recommending music and dance. No such system exists for recommending dance.

Moreover, unlike music, dance introduces physical requirements. Currently there is no system that recommends dance based on mood and/or physical condition. Technology can track dance moves using skeletal sensors or computer vision. However, there is no system of personalized recommendation of dance based on gathering data from skeletal tracking, health conditions, and moods. In different embodiments, the present design has roots in neuroscience and uses artificial intelligence to recommend music, dance styles, and peer groups based on emotion, health conditions, and energy levels. In some embodiments, the behavior design and gamification are used to encourage learning while building dance habits. The system in one embodiment includes at-home training with movement feedback, "mobile on the go" to continue the healing process throughout the day, and a platform to build a community focused on music and dance for healing. The present design also empowers participants to sync live with their communities, as if they were dancing to the same music even though they are not at the same location.

Contextualized data tracking reveals how music and movement can improve physiological functions and help achieve a more euthymic state.

FIG. 1 is a block diagram of one embodiment of the system's database 100, including one or more user profiles 102. In one embodiment, each user profile includes one or more of the attributes. For example, such attributes include:

Unique user identifier 104, which includes, but is not limited to the user's email address, phone number or other form of a unique identifier;

Demographic data 106, which for example includes age, gender, genetics, ethnicity, preferred language, weight, height, occupation, residential city, socioeconomic status;

Preference data 108, which for example includes privacy preference; energy level, favorite music, dance, singers, dancers, dance teachers, and groups; hobbies and interests; individuals/teachers/groups that he/she follows, and technical capability (low, medium, advanced); availability to dance (weekly schedule, preferences);

Historical data 110, which for example includes health condition, history (date of diagnosis, type of disease, area of the body, type of surgery, type of treatment), orthopedic as well as musculoskeletal problems, exercise habits (activity, frequency, duration), physiological measurements by sensors during exercise; and Lifestyle data 112, which, for example, is also tracked to gauge users' stress level and general wellbeing. This data includes: sleep, personality, romantic activity, sexual activity, diet, activities that require neurological executive planning and execution, how often a user goes to the gym, frequency and quality of family contact, community activities (call log, text, message, social media activities, family activities, and events). Social interaction and community support are utilized for data tracking as well. For example, friends and families can report a person's emotional states and wellness (buddy system).

In some embodiments, to build a culturally sensitive database for the system, the system associates or causes the association of each of the user's profile with at least one preference data, wherein the at least one preference data includes favorite music wherein the favorite music is a specified genre of music to generate a recommendation of a dance sequence. For example, Spanish-speaking older Latino adults, who may be suffering from an Alzheimer's disease-related dementia, may have a preference to do their dance sessions to Latino music. The system associates said user's preference data for Latino music to generate a recommendation of a dance sequence utilizing Latino music. In another embodiment, the preference data may include favorite groups such as Latino groups that facilitates matching of at least one buddy.

With continued reference to FIG. 1, in one embodiment, real-time situational data 114 is also collected. Such data includes one or more of the following: current medication effects, time, geographic location, device used (mobile, web, TV), and browser. Other external data may also be tracked to reveal the impact of users' emotions, such as social media, weather events, social and political climate, natural disasters, public health crises, pandemics, economic volatility and inequities, as well as other local, national and global events, such as, recent protests against racism across the globe.

With further reference to FIG. 1, in another embodiment, the user's real-time mood data 116 is also collected. The mood can include, such as but not limited to, happy, sad, tired, worried, scared, and angry. The mood tracking can be achieved both through self-report data within the user interface as well as computer vision and facial recognition technology.

In some embodiments, the system is adapted to integrate a voice user interface (VUI) that can include voice recognition technology. The VUI, in receiving audio data from a user, learns from and adapts to the user's voice. Audio data includes, but is not limited to, the user's voice and the characteristics of the user's voice such as phonation, pitch, loudness, and rate. Capabilities include detecting changes and differences in the phonation, pitch, loudness, and rate from a baseline user voice to determine the user's mood. The baseline user voice is the user's normal voice in a neutral mood when the user is not experiencing distress, fear, anxiety, or other emotion that could alter the user's voice. Changes and differences from the user's baseline voice may include, but are not limited to changes in pitch, hoarseness, shakiness, changes in volume, changes in talking speed, or differences in vibrato. Detection of these changes and differences may indicate changes in the mood of the user from a baseline normal mood. The VUI, in learning and adapting to the user's voice from the audio data received, can detect that the is experiencing a different mood such as anger, fear or stress, sadness, fatigue, or excitement.

In some embodiments, the VUI in receiving the user's audio data and learning from and adapting to the user's voice can detect changes or deviations in speech or in the user's voice from a baseline voice that may point to signs of early onset dementia. The VUI detects characteristics such as severity, roughness, breathiness, strain, voice rate, the presence of monopitch, or articulatory precision that deviate from the baseline voice and may indicate that the user is suffering from or at risk of developing early onset dementia. The VUI generates an alert based on these changes and deviations from the baseline voice.

Figure 2:
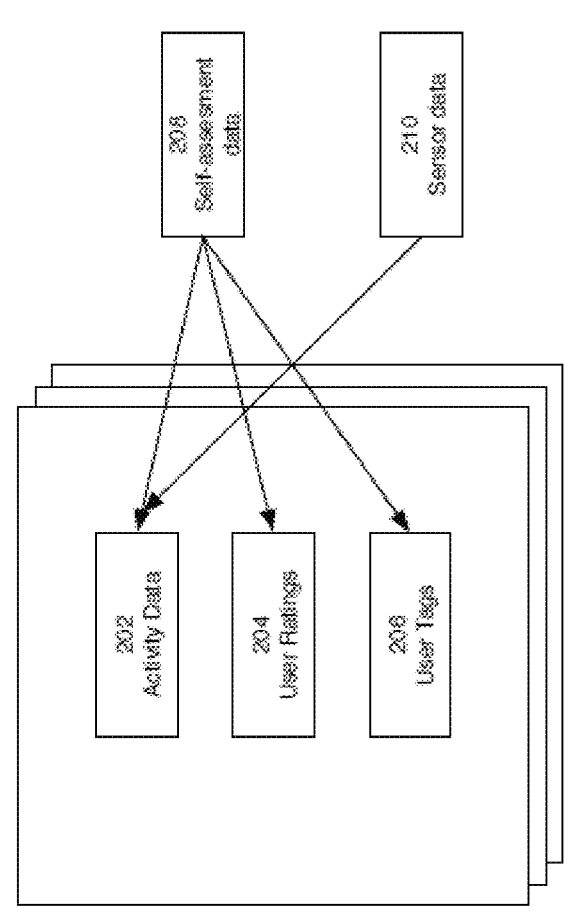
FIG. 2 is a block diagram of a user activity profile database according to the principles of the present invention.

FIG. 2 is a block diagram according to one embodiment of the system's database 200. The database 200 includes, for example, but not limited to, tracking information. The tracking information includes, for example, one or more of the following: activity data 202, user ratings 204 and user tags 206.

With continued reference to FIG. 2, activity data 202 tracks emotions before, during and after the dance, music (song title, genre, major key, minor key, etc.), dance (style, speed, intensity, energy level, upper body, lower body, etc.), duration of dance, calories burned, physiological progress measurements, what triggers the person to dance (music, reminders, events, buddy support), what causes the participant to continue dancing, and associated metrics. This data shows the user the impact of dance movement on their emotional state and physiological health. The activity data 202 in one embodiment has at least two general categories, and can be expanded to accommodate or enable new capabilities and features. The two categories may include but are not limited to:

a) self-assessment data 208 includes but not limited to multiple facets of well-being; physical, social/family, emotional, functional, plus additional concerns in questionnaire format; and b) sensor data 210 includes camera tracking and sensors (including but not limited to skeletal tracking and wearable devices) to gather information from different biosignals. The types of biosignals include, but are not limited to, heart rate, heart rate variability (HRV), musculoskeletal movement, speech recognition and speech analysis, respiratory patterns, oxygenation measurements, body temperature, blood pressure, electrodermal (galvanic skin) response as well as electrical conduction measurements, and electrical brain measurements. In one embodiment, biosignals are analyzed using standard algorithms that interpret the data and determine a user's physiological state, mood, and including but not limited to stress levels.

With continued reference to FIG. 2, user ratings 204 may include, for example, but not limited to, votes, frequency of use, user reviews, favorites, and saved dance sessions, videos, and sequences.

With further reference to FIG. 2, user tags 206 are different classifications made by the users and inputted into the system, such as 'jazz', 'beginners', 'happy', 'slow', etc. In one embodiment, user tags 206 may be programmatically added by applying standard music analysis techniques or computer vision or skeletal tracking.

Figure 3:
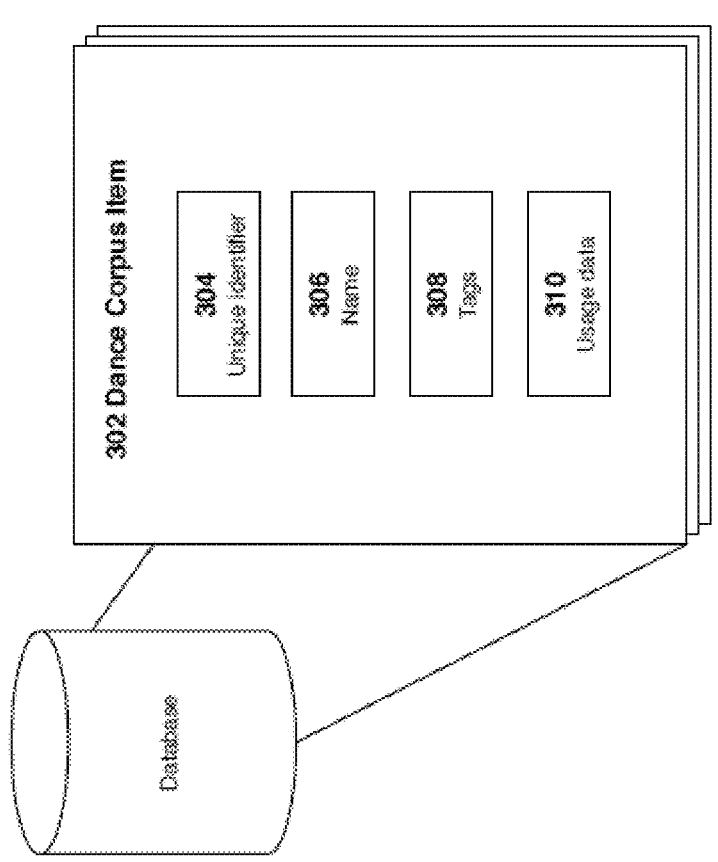
FIG. 3 is a block diagram of a dance corpus database according to the principles of the present invention.

FIG. 3 is a block diagram according to one embodiment of the system's database 300 including dance corpus item 302. Each user profile includes one or more of the following attributes: unique identifier 304, name 306 of song or dance, tags 308 (e.g. slow, fast, hip-hop), and usage data 310 (e.g. how many times the dance corpus being played, frequency, whether user finishes the dance sequence, etc.).

With continued reference to FIG. 3, unique user identifier 304, which for example includes, but not limited to the user's email address, phone number, or other forms of unique identifiers.

Figure 4:
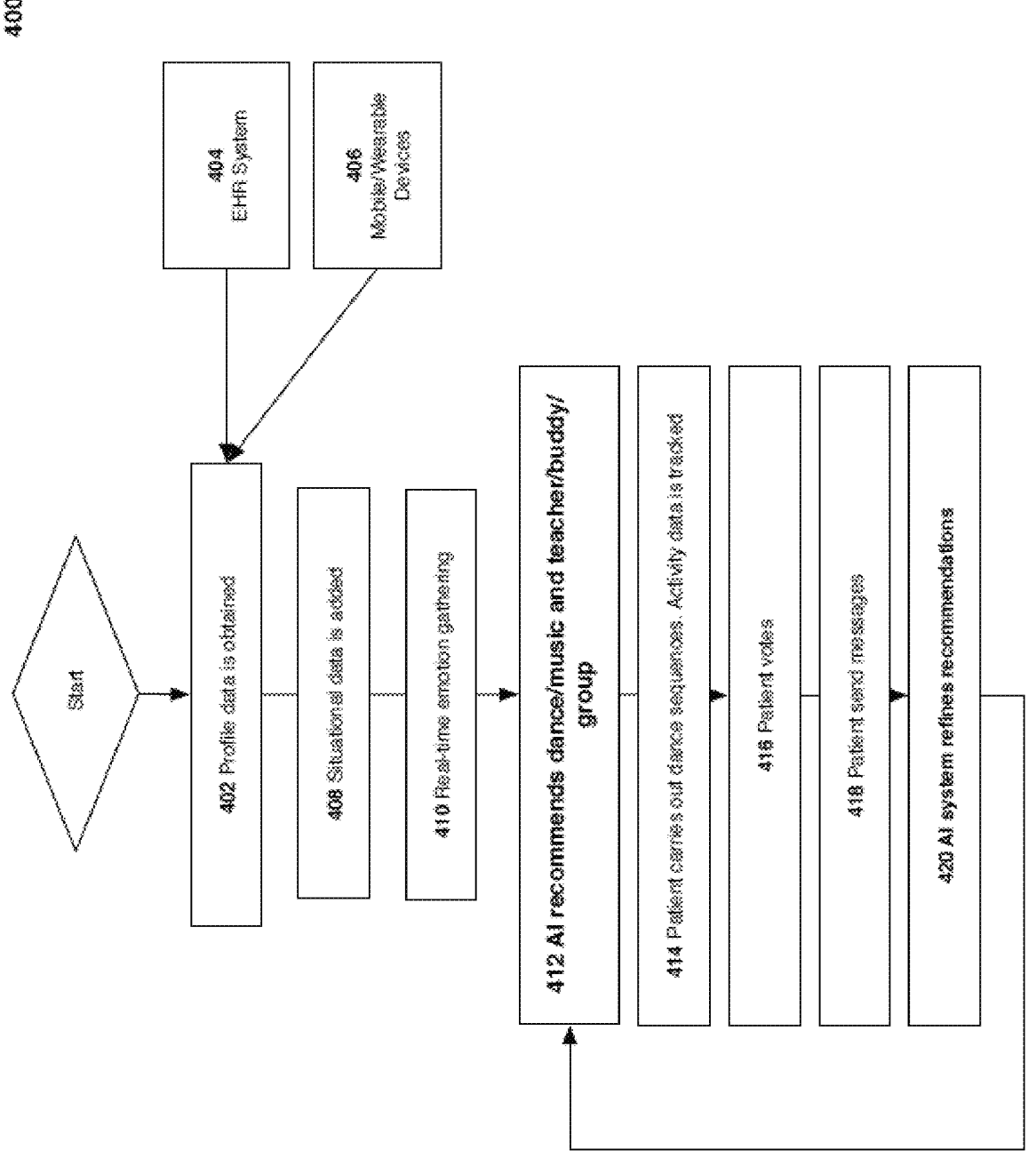
FIG. 4 is a flow chart of a system workflow according to the principles of the present invention.

FIG. 4 is a flow chart according to one embodiment of a workflow 400 of a system (e.g., system 800, system 1200) for providing personalized recommendations for music and dance based on the profile, situational, lifestyle and activity data. According to one embodiment, data acquisition is performed by asking the user to fill out a web form or a mobile application form at operation 402. According to another embodiment, such data may be added automatically by interfacing with an EHR system APIs 404 (e.g., AllScripts, Epic, etc.), or mobile, wearable or medical device SDK 406 (e.g., GPS location and wearable device logs). According to another embodiment, the user is asked for his or her situational data at operation 408 which may include one or more of the following: his or her schedule or availability data, behavioral triggers (e.g., reminders, notification due to insufficient physical activity), energy level, desired dance duration, whether they would like to dance alone or with a buddy/group. According to a further embodiment, the user is asked for his or her current mood 410 (e.g. happy or sad). This mood data can also be gathered through self-report data via clinical surveys, an interface of a tele-health platform, as well as technology like facial recognition, computer vision, voice recognition. For example, in some embodiments, the system is adapted to integrate a voice user interface (VUI) that can include voice recognition technology. The VUI, in receiving audio data from a user, learns from and adapts to the user's voice. Capabilities include detecting changes and differences in the phonation, pitch, loudness, and rate from a baseline user voice to determine the user's mood and/or stress level. The baseline user voice is the user's normal voice in a neutral mood when the user is not experiencing distress, fear, anxiety, heightened stress levels, or other emotion that could alter the user's voice. Changes and differences from the user's baseline voice may include, but are not limited to changes in pitch, hoarseness, shakiness, changes in volume, changes in talking speed, or differences in vibrato. Detection of these changes and differences may indicate changes in the mood and/or stress level of the user from a baseline normal mood. The VUI, in learning and adapting to the user's voice from the audio data received, can detect that the is experiencing a different mood or heighted state of stress such as anger, increased irritability, fear, sadness, fatigue, or excitement.

In some embodiments, the VUI, in receiving audio data from one or more users, can respond to user voice commands or statements. For example, a user could indicate to the system that "I am angry today" or "I want low energy" and present the user with videos of different dance routines based on the user's voice input at operation 412 as described hereinbelow. In some embodiments, the VUI can be configured to receive and recognize audio data a non-English language and to respond and execute user voice commands in the non-English language. Non-English languages that may be integrated into the voice user interface include, but are not limited to Spanish, French, French Creole, Chinese (including Mandarin, Cantonese, Hokkien, and other dialects), Tagalog, Vietnamese, Arabic, Korean, Japanese, Russian, German, Portuguese, Italian, Hindi, Punjabi, Telugu, Urdu, Persian, and Navajo.

In some embodiments, the VUI provides feedback in the form of audio output based on the audio data received from the user and can additional audio data from the user in response to the feedback provided. For example, in detecting a change in the user's mood, the VUI can ask whether the user is experiencing a particular mood in which the user will answer affirmatively or negatively and system presents the user with videos of different dance routines based on the audio data received at operation 412 as described hereinbelow.

In some embodiments, the VUI provides feedback in the form of audio output in a non-English language.

With continued reference to FIG. 4, the user is presented with videos of different dance routines matching his or her profile and situational data at operation 412, as described hereinbelow. In one embodiment, the system will recommend different dance teachers, dance buddies, or dance groups as described hereinbelow. The user can then choose a specific dance routine associated with such teachers, buddies, or groups. In another embodiment, the system will recommend dance routines based on the preferred language wherein the dance routines are in a non-English language. For example, a Spanish-speaking subject whose demographic data indicates Spanish as the preferred language may be recommended Spanish language dance routines. Once a dance routine is selected, the dance video from the system's video repository is presented to the user. As the user executes the dance sequence, tracking information is collected as described hereinbelow at operation 414. According to one embodiment, standard skeletal tracker, thermal tracking, oxygenation circulatory tracking, biosensor, wearable device, smart garment, camera, accelerometer or other methods are used to evaluate a user's dance sequence and progress (for example, is the user capable of following the music's beat, or the dance instructions). According to another embodiment, human motion is captured and matched against the music using standard methods, such as beat extraction or by inputting music beat information directly, and comparing that to change of motion at critical timing (as implemented by systems such as Kinect). Before, during, or after the execution of the dance, the user may provide feedback at operation 416 (e.g., upvote, downvote, favorite, save to list, etc.). Such data is stored in the user's profile and in the dance database. According to a further embodiment, the system allows the user to send messages (such as encouragement, recommendations, etc.) including, but not limited to, video, audio, olfactory/smell, virtual reality, and text to their groups and friends at operation 418. Finally, the system uses the new data to refine its recommendations going forward at operation 420 as described hereinbelow. According to one embodiment, the refinement can be done through online learning machine algorithm methodologies such as stochastic gradient descent which result in adjusted recommendations to each patient based on his/her most recent activities.

Figure 5:
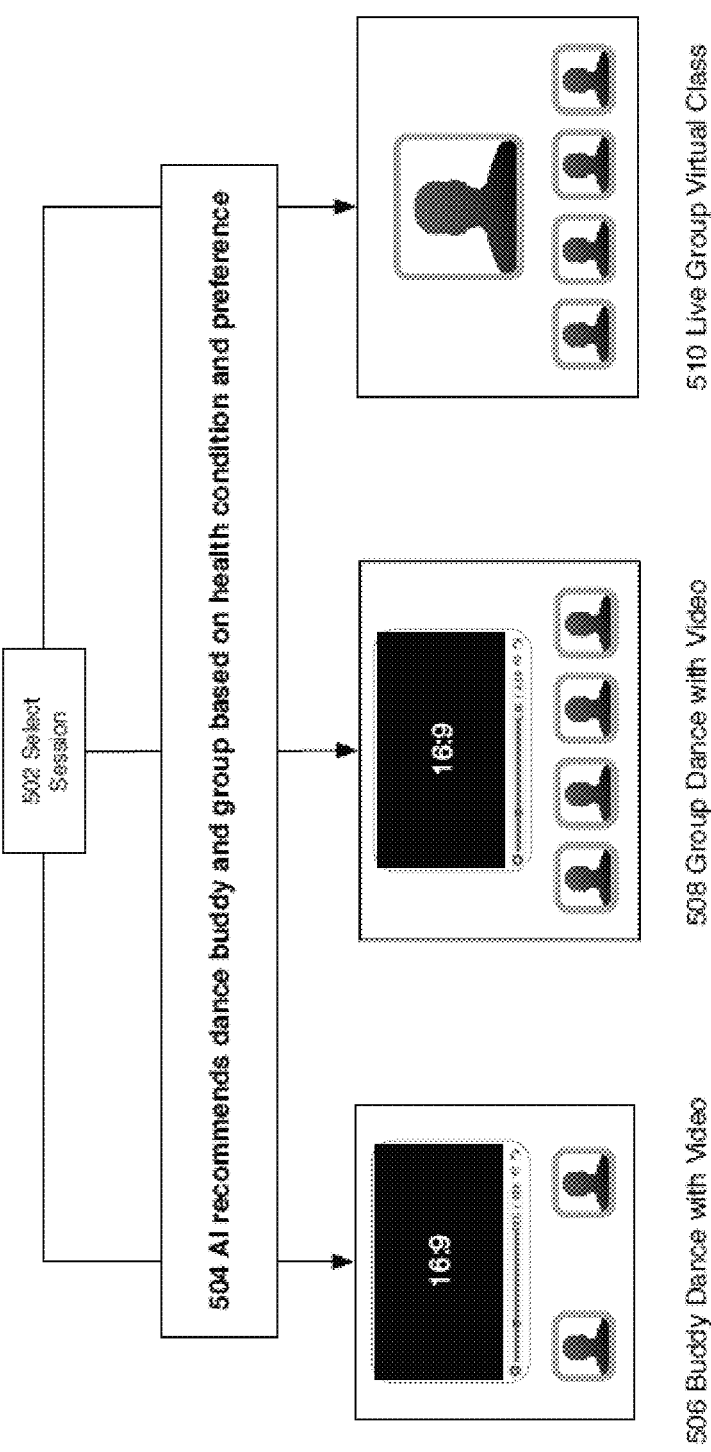
FIG. 5 is a block diagram of a system display modes according to the principles of the present invention.

FIG. 5 is a block diagram of one embodiment of the system's different display modes. According to one embodiment, the user selects a session at operation 502. At operation 504, AI recommends dance buddies and groups based on health condition, personality type, energy level, capability, and preference. In one embodiment, there are different types of sessions to select from: a session based on a pre-recorded dance sequence; in such case, the AI engine will recommend one or more video sequences and the user will select one; a "buddy" to dance with. The AI engine will recommend one or more "buddies" for the user to choose from. Once both users have agreed to be accountable buddies, the users will then be presented with a side-by-side video view, whereas both users can view each other's dance moves while watching the same pre-recorded videos, sessions, sequences; a group dance with the same video sequences, or live video teaching classes, where the AI engine will recommend one or more groups for the user to choose from and then display all users video streams in that particular group.

With continued reference to FIG. 5, 506 refers to sessions having buddy dance with video, 508 refers to sessions having group dance with video, 510 refers to live group virtual class.

In some embodiments, the display mode permits the toggling of closed captioning on and off wherein the closed captioning is show in the display mode. Closed captioning may assist those who are hard of hearing or may provide translation of a dance routine in one language to another language.

Figure 6:
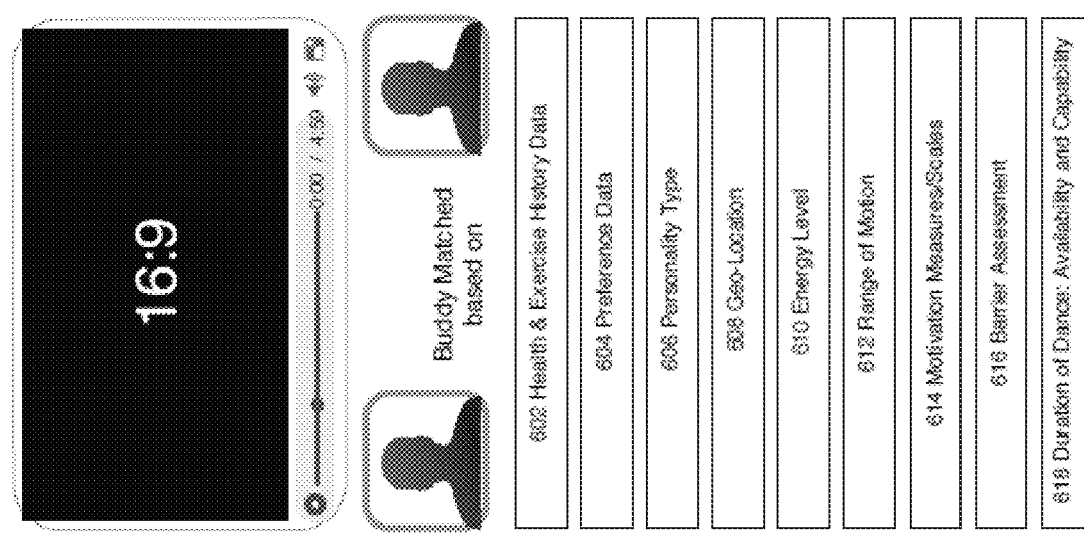
FIG. 6 is a block diagram of a system network and devices according to the principles of the present invention.

FIG. 6 illustrates how an AI engine recommends a committed behavior change buddy based on modules or functions including patient's Health and Exercise History data 602, Preference data 604, and Personality Type 606. Geolocation 608 will also be considered if users have indicated interest to meet their committed buddy not only online, but also in person. Our AI matching algorithm will focus on matching buddies based on their Energy Level 601, Range of Motion 612, Motivation Measures/Scales 614, Barrier Assessment 616, Duration of dance: Availability and Capability 618. Energy level has been validated by our users as one of the most important factors for them to be able to enjoy exercises and movements with a buddy. The availability and capability for the duration of dance is also an important factor to make the matching buddy easier to accommodate each other's schedule and time. Research has also shown different personality types create different preferences for exercise, music, and dance. This preference is important as they are crucial for an individual's comfort level, engagement, and commitment to the exercise activities. For example, a more mathematical engineer type of personality may prefer exercises and dances that are more structured, while a more artistic, creative type of personality may prefer more freeform types of exercises or dances. Below are some examples included, but not limited to on how we plan to match buddies based on personality types. There are traditional personality matching for compatibility. There are also multiple personality matching API. In one example, the present design utilizes a personality API which tracks individuals' social media activities, and analyzes their data to provide a personality recommendation.

FIG. 7 illustrates examples of user interfaces provided by a platform of the present design. As participants log in to the platform (e.g., dance healing platform, telehealth platform), this platform asks for their self-reported emotion, energy levels, and duration of the dance. User interface 701 shows the emotions to choose from including happy, sad, tired, angry, worried, and scared. These emotions can be customized based on the group of users we will be serving and the recommendation of their physicians and therapists. User interface 702 illustrates the energy levels to select from: low (Easy Breezy), medium (Mellow Bellow), and high (Dance Machine). The capability is reported as the length of time to dance which is selected from: 15 minutes, 30 minutes, 45 minutes, and 60 minutes. After the dance class, the emotion is reported again to track the before and after to use as a factor in future recommendations. Computer vision and facial recognition technology will be used as well for facial emotion tracking, the tracking data will be compared to participants' self-report data to ensure and improve the accuracy of the data.

Figure 8:
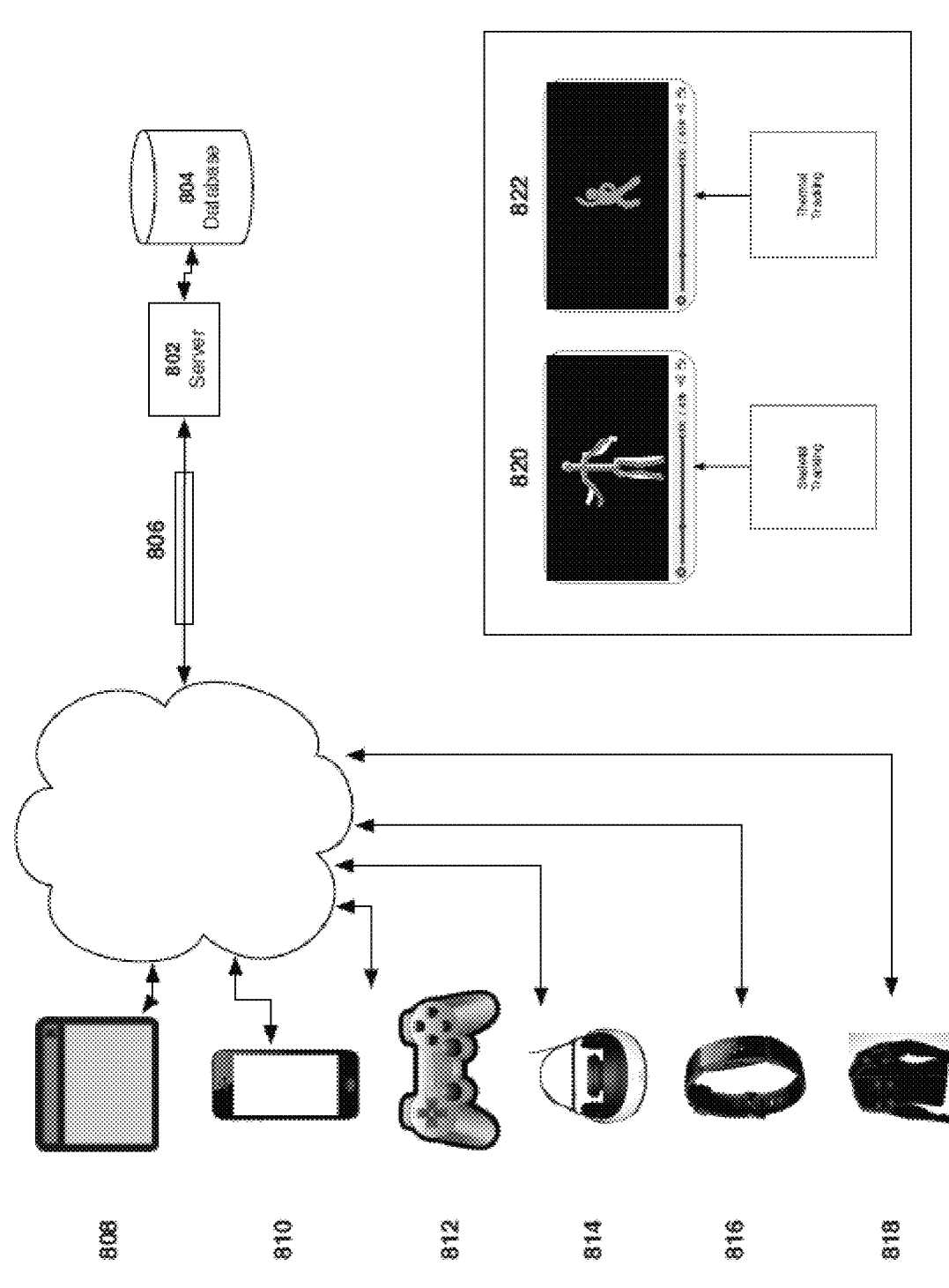
FIG. 8 is a block diagram of one embodiment of a network architecture of a system 800.

FIG. 8 is a block diagram of one embodiment of a network architecture of a system 800. According to one embodiment, the system 800 includes a server 802, a database 804 (e.g., SQL or NoSQL databases), connected over a network 806 (e.g., the Internet, cellular) to, for example, a user's web browser 808, mobile device 810, controller 812, other network device 814, wearable device 816, and smart garment 818. The communication uses standard internet protocols such as HTTP or HTTPS, as well as WebRTC or H323 and other streaming protocols for transferring of video and sound. The database 804 stores the users' profile information, user activity profiles, and the music and dance corpus.

With continued reference to FIG. 8, according to one embodiment, user actions and streamed content are logged and stored in the database 804 where it can later be retrieved to generate unique recommendations for the user. Each user's video usage data (which video, frequency, finish or not) is captured at his or her device such as web browser 808, mobile device 810, streamed to the server 802 and the server then multiplexes the streams and communicates them to the respective end user's devices.

With continued reference to FIG. 8, according to another embodiment, the system also includes controller 812, such as a PlayStation or Xbox controller, specialized remote control, or other hardware. Users are able to use the controller to enter profile data, provide feedback (thumbs up, thumbs down, favorite, save dance), select which type class/program/package they want to enroll in, etc. In one embodiment, the interface includes a virtual reality device 814, which is connected to the server system. Such a device can be used to consume the video stream from the server. In one embodiment, the interface includes wearable devices 816 and smart garment 818 that can track different biosignals, such as, but not limited to, heart rate, heart rate variability, steps, oxygenation measurement, etc. When such devices are used, the built-in tracking mechanism from these devices will also be engaged to further track user's usage data, progress, and feedback.

With continued reference to FIG. 8, as the user executes the dance sequence, tracking information is collected. According to one embodiment, standard skeletal tracker, thermal tracking, oxygenation circulatory tracking, biosensor, wearable device, smart garment, camera, accelerometer and/or other methods are used to evaluate a user's dance sequence and progress (for example, is the user capable of following the music's beat, or the dance instructions). According to another embodiment, human motion is captured and matched against the music using standard methods, such as beat extraction or by inputting music beat information directly, and comparing that to change of motion at critical timing (as implemented by systems such as Kinect). According to one embodiment, skeletal tracker 820 can also be expanded from one skeletal tracking to track user to creating a second skeletal tracking to track the instructor in the recorded instructional videos. As the user dances with the instructor video, if the user's skeleton is matching the instructor's skeleton, it communicates that the user is doing the correct movement/dance. This will allow us to further access the accuracy and the effectiveness of users' movement. Such implementation can also be expanded from dance movements tracking to physical therapy, occupational therapy, and sports medicine tracking. According to another embodiment, thermal tracking 822 will also be utilized to monitor the body temperature and possible circulatory issues (e.g. peripheral vascular disorders) of the users. When such devices are used, the built-in tracking mechanism from these devices will also be engaged to further track user's usage data, progress, and feedback.

In another embodiment, the physiological measurements of the subject and the recorded video with teacher's skeletal tracking data, and the system compares the subject skeletal tracking data and the recorded video's teacher skeletal tracking data and communicates to the subject whether the subject is matching movement of the teacher for the subject's selected dance routine.

Skeletal tracking data, via recording and/or streaming video data of the user's movements via the camera, may also be analyzed by the system to assess the subject's movement and balance and for assessing the risk of falls. The user's skeletal tracking data may indicate imbalance in the user's posture before, during, and after the dance routines. For example, the user may consistently place and shift his or her weight to one particular side of their body. The skeletal tracking data may also detect staggering or awkward placement or movement of the feet, which may indicate dizziness or vertigo and a heightened risk of falling. The use of skeletal tracking data by the system to assess balance and risk for falls may also be used to assess the appropriate level of dance routine intensity for the user. The system may recommend a lower intensity dance routine if the skeletal tracking or video data of the user indicates that the user struggled with balance and posture following a high intensity dance routine.

With further reference to FIG. 8, the recommendation process is meant to recommend a video that is appropriate according to the user's profile, overall collected tracking data and real-time emotion. These recommendations are obtained via information gathered from following user activity, physiological progress, or via explicit feedback or categorization by users who share a similar affinity of music and dance, similar demographic profile, geo-location, as well as others who share similar health conditions. For example, a 48-year-old breast cancer patient with limited upper body movement due to a mastectomy and a preference for a certain music and dance genre reporting a certain type of emotion, will be matched with music and dance that have been proven beneficial to other patients with similar conditions, restrictions and preferences, and who had reported similar real-time emotions. The recommendation process will also further tracking users' usage data, progress, and feedback to improve safety protocols to users, and groups of users with similar conditions or preferences.

Figure 9:
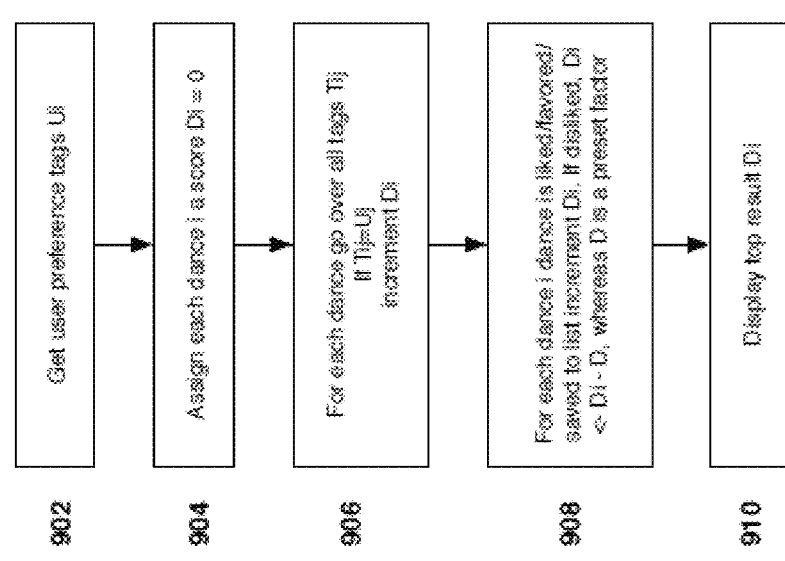
FIG. 9 is a block diagram of a dance recommendation engine according to the principles of the present invention.

FIG. 9 is a flow chart of operations for one embodiment of the system's recommendation engine 900 with the matching of music and dance based on explicit attributes or tags associated with each music and dance (e.g., jazz, hip-hop, suitable for seniors, suitable for people with limited upper body movement and energy level). According to one embodiment, the match is obtained by matching the user profile against all dance routines and calculating the matching score based on these tags. For example, tags indicated by the user are obtained at operation 902, and each dance is assigned a score of zero at operation 904 that is incremented for each matching tag at operation 906. According to another embodiment, specific user feedback pertaining to the dance, such as an up-vote, like or save for later causes the score to increase, and a dislike decreases it by a predefined factor, typically large enough to lower the probability of such a dance being suggested by the system at operation 908. The top matching dances are displayed at operation 910.

With continued reference to FIG. 9, making personal recommendations makes use of deep learning, or any other type of artificial intelligence, such as collaborative filtering, a social system which bases its recommendation on the judgment or feedback of a large number of people, to recommend music and dance that proved beneficial for similar patients with similar profiles, preferences, activity profile, and mood. Such collaborative filtering methods may rely on simple item-to-item filtering, based on the user profile and the dance attributes. The user then receives the top results ranked by standard distance metrics such as cosine distance.

With continued reference to FIG. 9, according to one embodiment, Probabilistic Latent Semantic Analysis (PLSA) methods or other collaborative filtering methods are used. Alternatively, the method can apply machine learning clustering algorithms, from less complex methods such as k-means to more complicated approaches such as artificial neural networks (ANN) to perform data clustering. In one embodiment, the method may make use of an ensemble of two or more machine learning methods to achieve better results.

With further reference to FIG. 9, according to another embodiment, the method leverages the resulting clustering data to make recommendations for individual friends (or "buddies") or groups of friends with similar health conditions or preferences, based on comparing user profiles. According to another embodiment, the system will recommend different classes, programs, or events.

Figure 10:
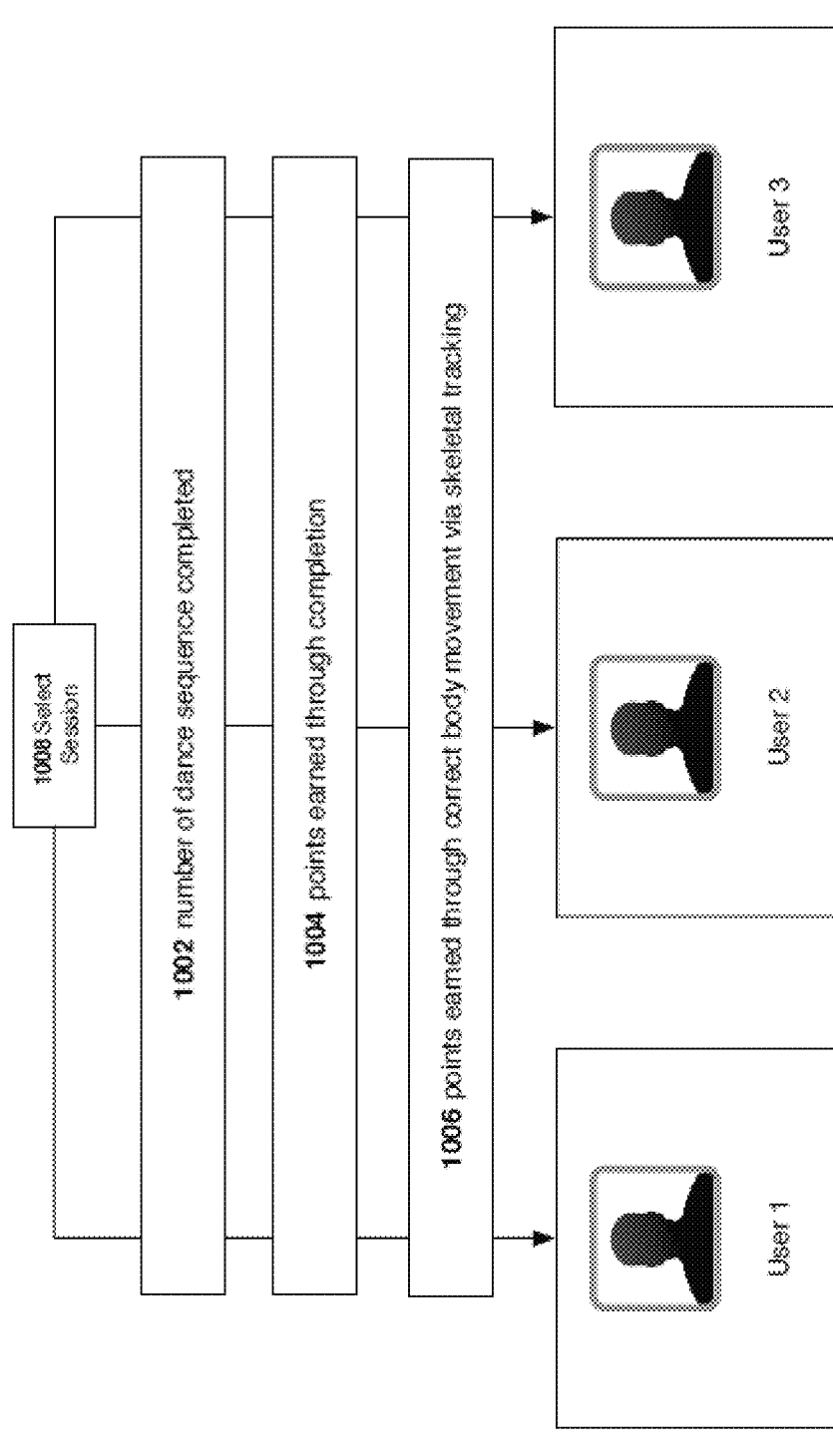
FIG. 10 is a block diagram of a gamification interface according to the principles of the present invention.

FIG. 10 is a block diagram of the gamification interface according to the principles of the present design. According to one, the system includes a gamification interface, whereby after a user select session at operation 1008, data are collected to reflect the user's activity data, such as the number of dance sequences executed per day, points earned by both the completion of the dances at operation 1002, as well as correct body movement confirmed through skeletal tracking at operation 1004 (for example, a user who supposed to exercise her/his shoulder needs to extend her/his arm in the horizontal expansion where her/his hand is at chest height to achieve rotation of her/his rotary cup in her/his shoulder, if her/his hand is below the chest height, she/he is not achieving the therapeutic effect of the dance, if her/his hand is at the correct chest height, s/he will gain a positive score of dance). The users' data are displayed against the scores of "buddies", groups or global users in the system, as derived from the user profile database. The data may also be used to show a user's progress and to compare a user's ability to others to follow a selected dance routine at operation 1006. The descriptions above are exemplary, as the trained observer will recognize that there are a variety of ways different functions may be accomplished, both in hardware and software.

The present design can include a system (e.g., system 800, system 1200) to execute a computer-implemented method 1100 of FIGS. 11A and 11B for providing a plurality of users with an environment for personalized dance activities. The computer-implemented method includes generating a plurality of dance sequences at operation 1102, and associating or causing the association of each of the plurality of dance sequences with at least one dance corpus classification at operation 1104. The computer-implemented method 1100 includes generating, for each of the plurality of users, a user profile at operation 1106 and receiving, from each of the plurality of users, at least one preference data at operation 1108. The computer-implemented method 1100 includes associating or causing the association of each of the user's profile with the at least one preference data at operation 1110 and generating a recommendation of a dance sequence for each of the plurality of users at operation 1112. Generating a recommendation is performed by using collaborative filtering based on the plurality of users' profiles. Generating a recommendation is performed through machine learning techniques for clustering the plurality of dance sequences based on the user profiles and at least one distance metric. The computer-implemented method 1100 further includes matching or causing the match of each of the dance corpus classifications with each of the user profiles at operation 1114. In one example, each user profile includes a mood parameter. The computer-implemented method 1100 further includes tracking at least one movement of each of the plurality of users at operation 1116. Generating a recommendation is performed through evaluating the movement of each of the users. The computer-implemented method 1100 further includes tracking each user's likes and votes at operation 1118. Generating a recommendation is performed through evaluating or causing the evaluation of each user's likes and votes. The computer-implemented method 1100 further includes receiving, from each of the users, at least one other user to dance with at operation 1120. The computer-implemented method 1100 further includes generating a recommendation of at least one other user to dance with for each of the users based on clustering of the respective user-profiles and preferences at operation 1122. The computer-implemented method 1120 further includes displaying or causing the display of recommended dance sequences at operation 1124. Virtual reality or augmented reality devices may be used to consume the dance routine. In one embodiment, a system for providing a plurality of users with an environment for personalized dance activities includes at least one computer including at least one processor (e.g., server 802), the at least one computer in communication with at least one data storage unit (e.g., data storage device 1216 database 804), the at least one computer programmed configured to: generate a plurality of dance sequences; associate or cause the association of each of the plurality of dance sequences with at least one dance corpus classification; generate, for each of the plurality of users, a user profile; receive, from each of the plurality of users, at least one preference data; associate or causing the association of each of the user's profile with the at least one preference data; and generate a recommendation (e.g., recommendation of a dance sequence, recommendation for type of music) for each of the plurality of users.

The present design in one embodiment also includes an interactive interface. This interface includes, in one embodiment, a display that allows the user to select a teacher (based on rating and teacher info), monitor their own progress as well as the progress of friends and groups, determine the type of music and dance they want to perform, watch instructional videos, and evaluate recommendations provided by the system based on user data and feedback.

The present design in another embodiment allows a user to also become a teacher. A user can create and upload their own dance routines and videos and share them with their friends and the entire member community. The member community includes different categories of groups of persons. A user in some embodiments is allowed to join select groups and become a member with other users in the groups as well as anyone in the member community.

The present design in another embodiment allows us to gather online data for teachers who teach music, dance, and art classes online via various live video platforms as well as social media, or in person, creating attributes for the classes they are teaching such as, but not limited to, energy level, the type of music, dance, cultural background, expertise of the teachers, time and location. Upon verification of the effective partnership model created, our system will recommend these as community programs users on our platform can participate. We will also be working with verified partners to train them to record high-quality videos, host these videos on our platform, empower them to convert simple online classes to healthy habit building programs, and recommend these programs tailored specifically to the needs of our users. These needs include, but are not limited to: health history, exercise history, surgery history, energy level, preference of music and dance, preference of gender, cultural background, etc. The system will also track users' feedback, and refine the recommendation based on user feedback, as well as include these feedback data for buddy matching. For example, if the two individuals demonstrate a lot of similarities in their choice of certain types of dance, certain groups of teachers, the system will recommend them as accountable buddies.

The present design in another embodiment will allow us to work with clinical partners to specifically design safety protocols for users with specific health conditions. For example, patients with irregular heartbeat wearing implantable cardioverter-defibrillator (ICD) devices may have anxiety, fear, and PTSD from the shock waves of the device, which reduce their physical activities. The system will utilize biosensor data such as heart rate monitor devices to gather heart rate data continually, provide warning before the participants reach the danger zone of their appropriate heart rates, as well as suggesting appropriate activities that will increase their heart rate when low activity is detected in a safe manner. With enough data gathered, the system can also eventually predict the appropriate level of exercise that may allow users to achieve an ideal heart rate.

The present design in another embodiment uses biosensors, wearable, and other devices to monitor an individual's physiological condition, including stress level, and automatically feeds the data to the environment to adjust the environment according to the person's emotional and physiological state, for example, music, home stereo systems, lighting, environmental controls, etc. The present design collates these data with geolocation data to monitor a population's stress level. These aggregate data can have multiple usages, for example, disaster prediction. It's widely known that animals and humans tend to sense an earthquake before it comes. This information can now be gathered and interpreted in a manner that makes it vital for disaster relief, public health and community health tracking, pandemic progress check and prevention, public safety, crime rate monitoring and reduction, helping first responders know what part of the city they should attend to in the particular time of the day, or during a particular event, etc.

In one embodiment, the present design's biosensor peripheral devices fit into wearables such as fabric or jewelry, such as, but not limited to, an earring, necklace, or a ring is able to tell an individual if they are at risk of, or facing imminent sickness due to exposure to some environmental intruder, either organic or synthetic (bacteria, virus, toxin, gas). A peripheral device, such as a decorative necklace, is enabled to help the wearer know when they are too stressed and prompt a few moments of meditation or other AI-determined programmatic intervention.

In various embodiments of the present design, as described above, an artificial intelligence recommendation system and methods are provided that recommend personalized music and dance based on a users' current physiological and emotional state health condition, reported through a detailed self-assessment and sensor interpolated as well as extrapolated data. The system and methods accomplish these objectives by analyzing databases of patient characteristics, activity history, and databases of music and dance that identify salient physiological and emotional characteristics in order to recommend specific pieces of music and dance to a user, accordingly. Once the music, dance files, patient characteristics, and user preferences have been analyzed and mapped, this system uses an algorithm to provide music and dance recommendations.

In various embodiments of the present design, as described above, the interfaces can be multimodal, including voice, gesture, facial, emotional recognition as well as other modalities. Intelligent wearables such as dance outfits, socks, knee pads, and other types of smart garments can also be used in measuring different activities and impacts, as well as detecting, tutoring, and preventing injuries.

Figure 12:
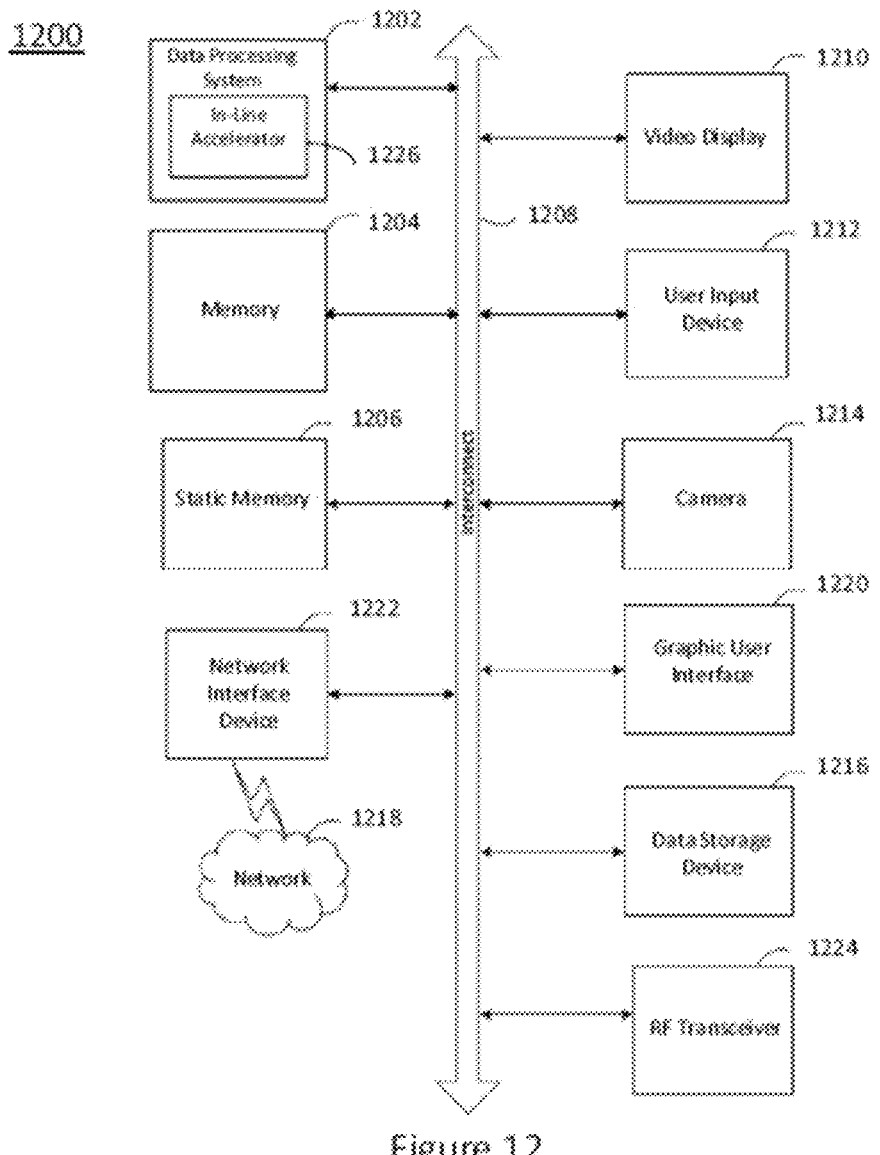
FIG. 12 is a diagram of a computer system including a data processing system according to an embodiment of the invention.

FIG. 12 is a diagram of a computer system including a data processing system according to an embodiment of the invention. Within the computer system 1200 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

Data processing system 1202 (e.g., CPU 1202), as disclosed above, includes a general-purpose instruction-based processor 1226. The general purpose instruction-based processor may be one or more general-purpose instruction-based processors or processing devices (e.g., microprocessor, central processing unit, or the like). More particularly, data processing system 1202 may be a complex instruction set computing (CISC) microprocessor, reduced instruction set computing (RISC) microprocessor, very long instruction word (VLIW) microprocessor, general-purpose instruction-based processor implementing other instruction sets, or general-purpose instruction-based processors implementing a combination of instruction sets. The in-line accelerator may be one or more special-purpose processing devices such as an application-specific integrated circuit (ASIC), a field-programmable gate array (FPGA), a digital signal general purpose instruction-based processor (DSP), network general-purpose instruction-based processor, many light-weight cores (MLWC) or the like. Data processing system 1202 is configured to implement the data processing system for performing the operations and steps discussed herein.

The exemplary computer system 1200 includes a data processing system 1202, a main memory 1204 (e.g., read-only memory (ROM), flash memory, dynamic random access memory (DRAM) such as synchronous DRAM (SDRAM) or DRAM (RDRAM), etc.), a static memory 1206 (e.g., flash memory, static random access memory (SRAM), etc.), and a data storage device 1216 (e.g., a secondary memory unit in the form of a drive unit, which may include fixed or removable computer-readable storage medium), which communicate with each other via a bus 1208. The storage units disclosed in the computer system 1200 may be configured to implement the data storing mechanisms for performing the operations and steps discussed herein.

The computer system 1200 may further include a network interface device 1222. In an alternative embodiment, the data processing system is integrated into the network interface device 1222 as disclosed herein. The computer system 1200 also may include a video display unit 1210 (e.g., a liquid crystal display (LCD), LED, or a cathode ray tube (CRT)) connected to the computer system through a graphics port and graphics chipset, an input device 1212 (e.g., a keyboard, a mouse, a microphone for a voice user interface), a camera 1214, and a Graphic User Interface (GUI) device 1220 (e.g., a touch-screen with input & output functionality).

The computer system 1200 may further include an RF transceiver 1224 provides frequency shifting, converting received RF signals to baseband and converting baseband transmit signals to RF. In some descriptions a radio transceiver or RF transceiver may be understood to include other signal processing functions such as modulation/demodulation, coding/decoding, interleaving/de-interleaving, spreading/despreading, inverse fast Fourier transforming (IFFT)/ fast Fourier transforming (FFT), cyclic prefix appending/ removal, and other signal processing functions.

The Data Storage Device 1216 may include a machine-readable storage medium (or more specifically a computer-readable storage medium) on which is stored one or more sets of instructions embodying any one or more of the methodologies or functions described herein. Disclosed data storing mechanisms may be implemented, completely or at least partially, within the main memory 1204 and/or within the data processing system 1202 by the computer system 1200, the main memory 1204 and the data processing system 1202 also constituting machine-readable storage media.

The computer-readable storage medium 1224 may also be used to one or more sets of instructions embodying any one or more of the methodologies or functions described herein. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

Figure 13:
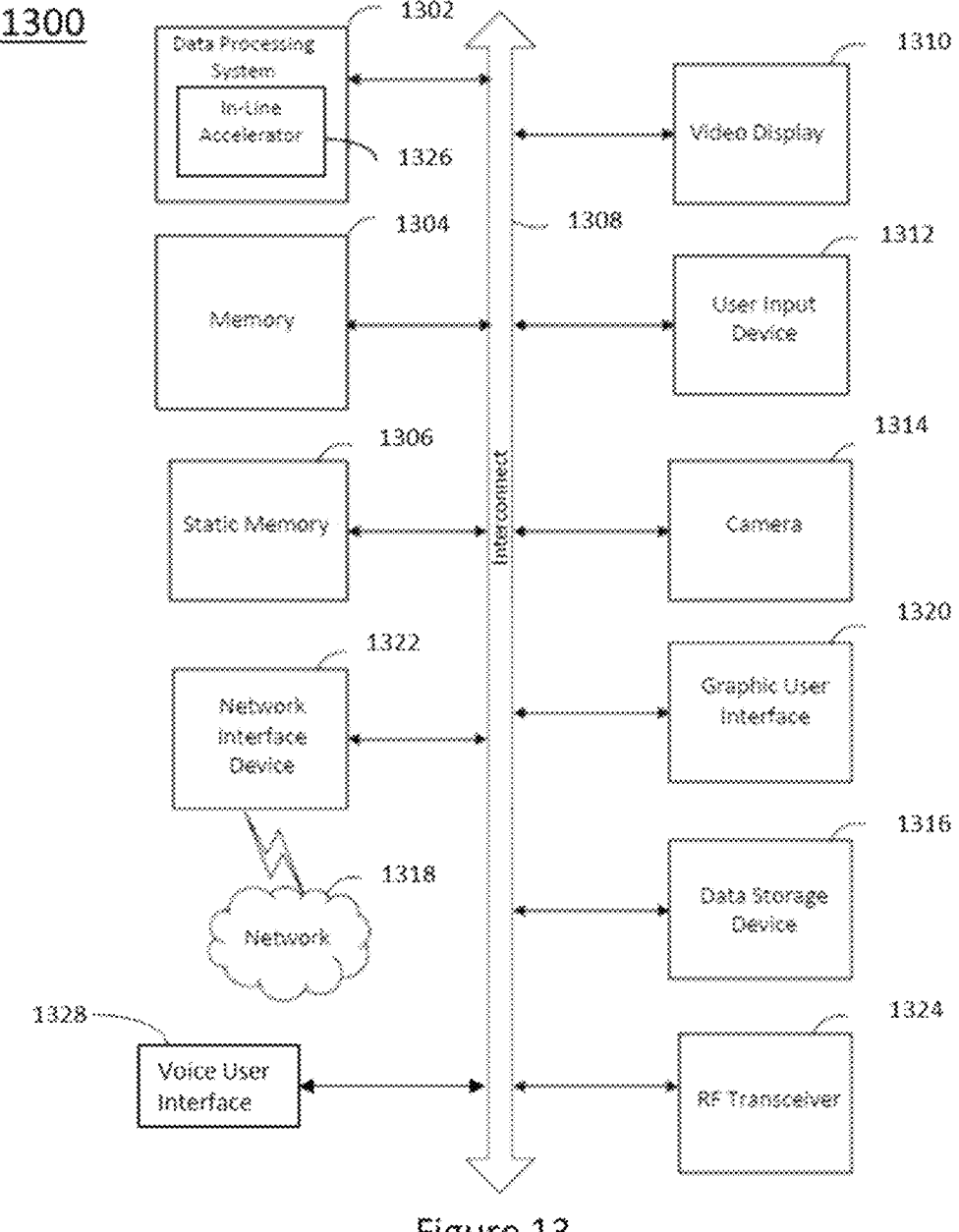
FIG. 13 is a diagram of a computer system including a data processing system according to another embodiment of the invention.

FIG. 13 is a diagram of another embodiment of a computer system including a data processing system according to an embodiment of the invention. Within the computer system 1300 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client in a client-server network environment, or as a peer machine in a peer-to-peer (or distributed) network environment, the machine can also operate in the capacity of a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines (e.g., computers) that individually or jointly execute a set (or multiple sets) of instructions to perform any one or more of the methodologies discussed herein.

Data processing system 1302 (e.g., CPU 1302), as disclosed above, includes a general-purpose instruction-based processor 1326. The general purpose instruction-based processor may be one or more general-purpose instruction-based processors or processing devices (e.g., microprocessor, central processing unit, or the like). More particularly, data processing system 1302 may be a complex instruction set computing (CISC) microprocessor, reduced instruction set computing (RISC) microprocessor, very long instruction word (VLIW) microprocessor, general-purpose instruction-based processor implementing other instruction sets, or general-purpose instruction-based processors implementing a combination of instruction sets. The in-line accelerator may be one or more special-purpose processing devices such as an application-specific integrated circuit (ASIC), a field-programmable gate array (FPGA), a digital signal general purpose instruction-based processor (DSP), network general-purpose instruction-based processor, many light-weight cores (MLWC) or the like. Data processing system 1302 is configured to implement the data processing system for performing the operations and steps discussed herein.

The exemplary computer system 1300 includes a data processing system 1302, a main memory 1304 (e.g., read-only memory (ROM), flash memory, dynamic random access memory (DRAM) such as synchronous DRAM (SDRAM) or DRAM (RDRAM), etc.), a static memory 1306 (e.g., flash memory, static random access memory (SRAM), etc.), and a data storage device 1316 (e.g., a secondary memory unit in the form of a drive unit, which may include fixed or removable computer-readable storage medium), which communicate with each other via a bus 1308. The storage units disclosed in the computer system 1300 may be configured to implement the data storing mechanisms for performing the operations and steps discussed herein.

The computer system 1300 may further include a network interface device 1322. In an alternative embodiment, the data processing system is integrated into the network interface device 1322 as disclosed herein. The computer system 1200 also may include a video display unit 1310 (e.g., a liquid crystal display (LCD), LED, or a cathode ray tube (CRT)) connected to the computer system through a graphics port and graphics chipset, an input device 1312 (e.g., a keyboard, a mouse), a camera 1314, a Graphic User Interface (GUI) device 1320 (e.g., a touch-screen with input & output functionality), and a Voice User Interface 1328 (e.g. voice command mobile device, smart speaker). The VUI 1328 includes one or more microphones for receiving audio data from one or more users and includes a speaker to provide audio output to the user. The camera 1314 can be a webcam or any other video camera that is capable of recording or streaming to the computer system. In some embodiments, video data via the camera 1314 and audio data the via the VUI 1328 of the subject is collected and recorded onto the platform and the computer system analyzes these data to assess the subject's movement, mood, emotional state, body energy, stress level, potential risks for falls, and other physical, mental, and neurological health-related data.

The computer system 1300 may further include an RF transceiver 1324 provides frequency shifting, converting received RF signals to baseband and converting baseband transmit signals to RF. In some descriptions a radio transceiver or RF transceiver may be understood to include other signal processing functions such as modulation/demodulation, coding/decoding, interleaving/de-interleaving, spreading/despreading, inverse fast Fourier transforming (IFFT)/fast Fourier transforming (FFT), cyclic prefix appending/removal, and other signal processing functions.

The Data Storage Device 1316 may include a machine-readable storage medium (or more specifically a computer-readable storage medium) on which is stored one or more sets of instructions embodying any one or more of the methodologies or functions described herein. Disclosed data storing mechanisms may be implemented, completely or at least partially, within the main memory 1304 and/or within the data processing system 1302 by the computer system 1300, the main memory 1304 and the data processing system 1302 also constituting machine-readable storage media.

The computer-readable storage medium 1324 may also be used to one or more sets of instructions embodying any one or more of the methodologies or functions described herein. While the computer-readable storage medium 1324 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

FIG. 14 shows the platform's interface during a dance routine. The top panel shows the dance routine video and the bottom two panels show the video screens of the other participants in the dance routine, which may include the subject and the intergenerational buddy or other family members or friends. In addition to rewind and fast forward, volume functions, and full screen functions, the video player includes a closed captioning toggle button, which may display closed captioning in English or a non-English language wherein the non-English closed captioning may be a translation from English or vice versa.

EXAMPLES

Example 1—8-Week Mindful Movement Telehealth Program for Diabetes Mellitus Patients All assessments, including study eligibility, will be reviewed by trained study team members. The inclusion criteria for diabetes mellitus (DM) patients are as follows:
Diagnosis of Type 2 Diabetes Mellitus
Have a primary care doctor
HbA1c>6.5% and <15%
Not physically active for 3 days per week or more for 20 minutes each time for the last 6 months and not participating in regular resistance exercise
Has a caregiver at home, and the caregiver must be 100% present when the patient uses the platform
Ability to consent
The inclusion criteria for care partners is as follows:
Providing care for patients with DM participating in this study
Intergenerational Buddies (IB) are individuals in different generations or age categories who are related or not related and are recruited to participate in this study to serve as a companion for patients/family caregivers in the study. The IBs must be comfortable with technology and committed to supporting patients and caregivers.

All participants must be between 18 and 75 years of age, have a computer with a camera, have a good internet connection and broadband speed at home, possess the ability to speak, read, and understand basic English, not be physically active for 3 days per week or more for 20 minutes each time for the last 6 months and not participating in regular resistance exercise, available to participate fully in the 8-week program (launch session, weekly session, and closing session), and whose home environment and attire are verified to follow fall prevention protocols. Participants must complete the fall prevention checklist and score less than 4: https://www.ncoa.org/article/falls-prevention-conversation-guide-for-caregivers.

Patients having the following criteria are excluded from the study:

Blood pressure of 160/100 mmHg or higher
HbA1c>15%.
Insulin-dependent.
Severe coronary disease.
By-pass surgery.
Heart attack within the last year
Recent stroke
Any history of falls
Care givers having any serious medical condition which would prevent long-term participation or contraindicate physical activity are excluded from the study.

Among all participants, those aged less than 18 years or greater than 75 years, unable to speak, read, and understand basic English, have any serious medical condition which would prevent long-term participation or contraindicate physical activity, exhibit evidence of cardiovascular, respiratory, or renal disease; auto-immune disease; advanced neuropathy or retinopathy; cancers requiring treatment in the past 2 years, except with excellent prognosis; Infectious disease including HIV, AIDS, tuberculosis; or severe psychotic disorders, belong to a vulnerable population, which may include but not limited to pregnant women, human fetuses and neonates, prisoners, children, the handicapped, mentally disabled persons, persons with impaired capacity to consent, and students or employees of the study institution, those participating in another health study, those whose home environment and attire are not verified to follow fall prevention protocols, and those who scored ≥4 on the home prevention checklist, indicating that the participant may be at risk for a serious fall, are excluded from the study.

This study does not include vulnerable populations including, but may not be limited to, pregnant women, human fetuses and neonates, prisoners, children, the handicapped, mentally disabled persons, persons with impaired capacity to consent, and students or employees of the institution.

Pregnant women are not included in the study due to safety considerations. The program is designed to help participants exercise at low, moderate, and high intensity levels, which may pose unnecessary risks to pregnant women and their fetuses. If a participant becomes pregnant during the study, they will be withdrawn from the study by the principal investigator and study team.

This research study includes adults only, not children under age 18 or adults over 75 years of age. To ensure participant safety, the study does not enroll individuals who are unable to consent on their own and will not permit the use of legally authorized representatives.

The study is conducted remotely and online through the participants' computers.

Thirty participants are divided into ten trios wherein each trio includes one DM patient, one caregiver, and one IB. Each participant in the study is issued a Garmin Vivosmart® 4 fitness watch and an OMRON Scale. The participants use both devices in the study. The fitness watch, worn during each session, tracks activity, heart rate, sleep quality, and stress levels. The scale, which is a body composition monitor, tracks track fat-burning, muscle gain, and body mass index. Participants weigh in daily in the morning prior to eating or drinking anything, after using the bathroom. Participants weigh themselves wearing the same clothes daily (e.g. pajamas) or in the nude to maintain consistency.

The study lasts for a duration of eight weeks.

The telehealth platform includes at least 40 recorded classes at 3 levels of intensity (Low, Medium, High) and in four time durations or class length (15, 30, 45, and 60 minutes).

In weeks 0-1 participants are asked to complete the Quality of Life Scale (SF-12) questionnaire regarding usability, difficulties, complexity, and time required. Participants receive instructions about setting up an account on the telehealth platform. The study team hosts tech support sessions to answer questions and resolve any potential challenges that may come up.

In week 1, participants are welcomed to the program with a 2-hour introduction online session with a live instructor. All participants simultaneously access the telehealth platform and participate together as a group. There are introductions, education, ice-breaker activities, and dance classes during the 2-hour session. Participants meet their IB in the introduction session. Participants are given instructions for choosing their activity intensity level for the dance lessons (Low, Moderate, or High and encouraged to dance at least 3 additional times per week with their assigned buddy using the recorded sessions for a minimum of 30 minutes each time, with the ability to select dance intensity (low/moderate/high) on the telehealth platform.

During weeks 2-7 participants participate in a 1-hour online, instructor-led live class each week. Each session includes bonding exercises, mindful movement, and art & creativity reflection. In addition, participants are asked to dance with their IB using the telehealth platform at least 3 additional times/week for a minimum of 30 minutes each time. Caregivers can dance alongside patients with their IBs remotely using the telehealth platform, watching the same recorded video at their own agreed time.

In week 8, the final week of the study, participants are asked to participate in a final 2-hour session with a 45-60-minute dance class followed by a completion celebration. There will be bonding exercises, mindful movement, art & creativity reflection, and time to provide feedback and suggestions to the study team during the 2-hour session. Participants are asked to complete a Net Promoter Score (NPS) survey, comprising a single question "On a scale of 0-10, how likely would you be to recommend [SERVICE/PRODUCT] to a friend or family member?" Participants continue to have access to the telehealth platform until the end of the 8th week.

Alternative options such as seated dances are offered to those participants who require them.

Example 2—8-Week Mindful Movement Telehealth Program for Alzheimer's Disease-Related Dementia Patients All assessments, including study eligibility, will be reviewed by trained study team members. The inclusion criteria for Alzheimer's disease-related dementia (ADRD) patients are as follows:

Diagnosis of an Alzheimer's Disease-Related Dementia
  (ADRD)

Have a primary care doctor

Not physically active for 3 days per week or more for 20
  minutes each time for the last 6 months and not
  participating in regular resistance exercise Has a caregiver at home, and the caregiver must be 100%
  present when the patient uses the platform Ability to consent The inclusion criteria for care partners is as follows:

Providing care for patients with ADRD participating in
  this study

Intergenerational Buddies (IB) are individuals in different
generations or age categories who are related or not related
and are recruited to participate in this study to serve as a
companion for patients/family caregivers in the study. The
IBs must be comfortable with technology and committed to
supporting patients and caregivers.

All participants must be between 18 and 75 years of age,
have a computer with a camera, have a good internet
connection and broadband speed at home, possess the ability
to speak, read, and understand basic English, not be physi-
cally active for 3 days per week or more for 20 minutes each
time for the last 6 months and not participating in regular
resistance exercise, available to participate fully in the
8-week program (launch session, weekly session, and clos-
ing session), and whose home environment and attire are
verified to follow fall prevention protocols. Participants
must complete the fall prevention checklist and score less
than 4: https://www.ncoa.org/article/falls-prevention-con-
versation-guide-for-caregivers.

Patients having the following criteria are excluded from
the study:

Blood pressure of 160/100 mmHg or higher.

Severe coronary disease.

By-pass surgery.

Heart attack within the last year.

Recent stroke.

Any history of falls

Inability to consent

Care givers having any serious medical condition which
would prevent long-term participation or contraindicate
physical activity are excluded from the study.

Among all participants, those aged less than 18 years or
greater than 75 years, unable to speak, read, and understand
basic English, have any serious medical condition which
would prevent long-term participation or contraindicate
physical activity, exhibit evidence of cardiovascular, respi-
ratory, or renal disease; auto-immune disease; advanced
neuropathy or retinopathy; cancers requiring treatment in the
past 2 years, except with excellent prognosis; Infectious
disease including HIV, AIDS, tuberculosis; or severe psy-
chotic disorders, belong to a vulnerable population, which
may include but not limited to pregnant women, human
fetuses and neonates, prisoners, children, the handicapped,
mentally disabled persons, persons with impaired capacity
to consent, and students or employees of the study institu-
tion, those participating in another health study, those whose
home environment and attire are not verified to follow fall
prevention protocols, and those who scored ≥4 on the home
prevention checklist, indicating that the participant may be
at risk for a serious fall, are excluded from the study.

This study does not include vulnerable populations
including, but may not be limited to, pregnant women,
human fetuses and neonates, prisoners, children, the handicapped, mentally disabled persons, persons with impaired
capacity to consent, and students or employees of the
institution.

Pregnant women are not included in the study due to
safety considerations. The program is designed to help
participants exercise at low, moderate, and high intensity
levels, which may pose unnecessary risks to pregnant
women and their fetuses. If a participant becomes pregnant
during the study, they will be withdrawn from the study by
the principal investigator and study team.

This research study includes adults only, not children
under age 18 or adults over 75 years of age. To ensure
participant safety, the study does not enroll individuals who
are unable to consent on their own and will not permit the
use of legally authorized representatives.

The study is conducted remotely and online through the
participants' computers.

Thirty participants are divided into ten trios wherein each
trio includes one ADRD patient, one caregiver, and one IB.
Each participant in the study is issued an Amazon Echo®
having the Alexa® platform as a voice user interface (VUI).
The telehealth platform is configured to connect with and
integrate the VUI such as the Amazon Echo® having the
Alexa® platform i.e. is a "Works with Alexa®" product.

The study lasts for a duration of eight weeks.

The telehealth platform includes at least 40 recorded
classes at 3 levels of intensity (Low, Medium, High) and in
four time durations or class length (15, 30, 45, and 60
minutes). The subjects choose these options by clicking a
button on the screen using their computer or using the VUI
to say it out loud (e.g., "I want low energy").

In weeks 0-1 participants are asked to complete the
Quality of Life Scale (SF-12) questionnaire regarding
usability, difficulties, complexity, and time required. Partici-
pants receive instructions about setting up an account on the
telehealth platform. The study team hosts tech support
sessions to answer questions and resolve any potential
challenges that may come up.

In week 1, participants are welcomed to the program with
a 2-hour introduction online session with a live instructor.
All participants simultaneously access the telehealth plat-
form and participate together as a group. There are intro-
ductions, education, ice-breaker activities, and dance classes
during the 2-hour session. Participants meet their IB in the
introduction session. Participants are given instructions for
choosing their activity intensity level for the dance lessons
(Low, Moderate, or High and encouraged to dance at least 3
additional times per week with their assigned buddy using
the recorded sessions for a minimum of 30 minutes each
time, with the ability to select dance intensity (low/moder-
ate/high) on the telehealth platform.

During weeks 2-7 participants participate in a 1-hour
online, instructor-led live class each week. Each session
includes bonding exercises, mindful movement, and art &
creativity reflection. In addition, participants are asked to
dance with their IB using the telehealth platform at least 3
additional times/week for a minimum of 30 minutes each
time. Caregivers can dance alongside patients with their IBs
remotely using the telehealth platform, watching the same
recorded video at their own agreed time.

In week 8, the final week of the study, participants are
asked to participate in a final 2-hour session with a 45-60-
minute dance class followed by a completion celebration.
There will be bonding exercises, mindful movement, art &
creativity reflection, and time to provide feedback and
suggestions to the study team during the 2-hour session.
Participants are asked to complete a Net Promoter Score (NPS) survey, comprising a single question "On a scale of 0-10, how likely would you be to recommend [SERVICE/PRODUCT] to a friend or family member?" Participants continue to have access to the telehealth platform until the end of the 8th week.

Alternative options such as seated dances are offered to those participants who require them.

Example 3—8-Week Mindful Movement Telehealth Program for Spanish-Speaking Older Latino Adults with Alzheimer's Disease-Related Dementia All assessments, including study eligibility, will be reviewed by trained study team members. The inclusion criteria for Spanish-speaking older Latino adults with Alzheimer's Disease-Related Dementia (ADRD) patients are as follows:

Diagnosis of an ADRD

Have a primary care doctor

Age between 18-75

Latino or Hispanic descent and speaks Spanish

Has a caregiver at home, and the caregiver must be 100% present when the patient uses the platform Ability to consent The inclusion criteria for care partners is as follows:

Providing care for patients with ADRD participating in this study and is of Latino or Hispanic descent Intergenerational Buddies (IB) are individuals in different generations or age categories who are related or not related and are recruited to participate in this study to serve as a companion for patients/family caregivers in the study. The IBs must be comfortable with technology and committed to supporting patients and caregivers. The IBs in this study are of Latino or Hispanic descent but do not need to speak Spanish.

All participants must be between 18 and 75 years of age, have a computer with a camera, have a good internet connection and broadband speed at home, not be physically active for 3 days per week or more for 20 minutes each time for the last 6 months and not participating in regular resistance exercise, have the ability to speak, read, and understand basic English at an elementary proficiency, available to participate fully in the 8-week program (launch session, weekly session, and closing session), and whose home environment and attire are verified to follow fall prevention protocols. Participants must complete the fall prevention checklist and score less than 4: https://www.ncoa.org/article/falls-prevention-conversation-guide-for-caregivers.

Patients having the following criteria are excluded from the study:

Blood pressure of 160/100 mmHg or higher

Severe coronary disease

By-pass surgery

Heart attack within the last year

Recent stroke.

Any history of falls

Inability to consent

Care givers having any serious medical condition which would prevent long-term participation or contraindicate physical activity are excluded from the study.

Among all participants, those aged less than 18 years or greater than 75 years, unable to speak, read, and understand basic English at the ILR 1 level, have any serious medical condition which would prevent long-term participation or contraindicate physical activity, exhibit evidence of cardiovascular, respiratory, or renal disease; auto-immune disease; advanced neuropathy or retinopathy; cancers requiring treatment in the past 2 years, except with excellent prognosis; Infectious disease including HIV, AIDS, tuberculosis; or severe psychotic disorders, belong to a vulnerable population, which may include but not limited to pregnant women, human fetuses and neonates, prisoners, children, the handicapped, mentally disabled persons, persons with impaired capacity to consent, and students or employees of the study institution, those participating in another health study, those whose home environment and attire are not verified to follow fall prevention protocols, and those who scored ≥4 on the home prevention checklist, indicating that the participant may be at risk for a serious fall, are excluded from the study.

This study does not include vulnerable populations including the handicapped, mentally disabled persons, persons with impaired capacity to consent, and students or employees of the institution.

This research study includes geriatric adults only, not adults under age 60 or adults over 75 years of age. To ensure participant safety, the study does not enroll individuals who are unable to consent on their own and will not permit the use of legally authorized representatives.

The study is conducted remotely and online through the participants' computers.

Thirty participants are divided into ten trios wherein each trio includes one ADRD patient, one caregiver, and one IB. Each participant in the study is issued a Garmin Vivosmart® 4 fitness watch and an OMRON Scale. The participants use both devices in the study. The fitness watch, worn during each session, tracks activity, heart rate, sleep quality, and stress levels. The scale, which is a body composition monitor, tracks track fat-burning, muscle gain, and body mass index. Participants weigh in daily in the morning prior to eating or drinking anything, after using the bathroom. Participants weigh themselves wearing the same clothes daily (e.g. pajamas) or in the nude to maintain consistency.

The study lasts for a duration of eight weeks.

The telehealth platform includes at least 40 recorded classes at 3 levels of intensity (Low, Medium, High), in four time durations or class length (15, 30, 45, and 60 minutes), and in two different languages (English and Spanish).

In weeks 0-1 participants are asked to complete the Quality of Life Scale (SF-12) questionnaire regarding usability, difficulties, complexity, and time required. Participants receive instructions about setting up an account on the telehealth platform. The study team hosts tech support sessions to answer questions and resolve any potential challenges that may come up.

In week 1, participants are welcomed to the program with a 2-hour introduction online session with a live instructor. All participants simultaneously access the telehealth platform and participate together as a group. There are introductions, education, ice-breaker activities, and dance classes during the 2-hour session. Participants meet their IB in the introduction session. Participants are given instructions for choosing their activity intensity level for the dance lessons (Low, Moderate, or High and encouraged to dance at least 3 additional times per week with their assigned buddy using the recorded sessions for a minimum of 30 minutes each time, with the ability to select dance intensity (low/moderate/high) on the telehealth platform.

During weeks 2-7 participants participate in a 1-hour online, instructor-led live class each week. Each session includes bonding exercises, mindful movement, and art & creativity reflection. In addition, participants are asked to dance with their IB using the telehealth platform at least 3 additional times/week for a minimum of 30 minutes each time. Caregivers can dance alongside patients with their IBs remotely using the telehealth platform, watching the same recorded video at their own agreed time.

In week 8, the final week of the study, participants are asked to participate in a final 2-hour session with a 45-60-minute dance class followed by a completion celebration. There will be bonding exercises, mindful movement, art & creativity reflection, and time to provide feedback and suggestions to the study team during the 2-hour session. Participants are asked to complete a Net Promoter Score (NPS) survey, comprising a single question "On a scale of 0-10, how likely would you be to recommend [SERVICE/PRODUCT] to a friend or family member?" Participants continue to have access to the telehealth platform until the end of the 8th week. Alternative options such as seated dances are offered to those participants who require them.

Example 4—8-Week Mindful Movement Telehealth Program for Cancer Patients

All assessments, including study eligibility, were reviewed by trained study team members. The inclusion criteria for cancer patients were as follows:

Diagnosis of a cancer, currently in treatment, or completed treatment

Have a primary care doctor

Not physically active for 3 days per week or more for 20 minutes each time for the last 6 months and not participating in regular resistance exercise Has a caregiver at home, and the caregiver must be 100% present when the patient uses the platform Ability to consent The inclusion criteria for care partners were as follows:

Providing care for patients with cancer participating in this study

All participants were between 18 and 75 years of age, had a computer with a camera, had a good internet connection and broadband speed at home, possessed the ability to speak, read, and understand basic English, were not physically active for 3 days per week or more for 20 minutes each time for the last 6 months and not participating in regular resistance exercise, were available to participate fully in the 8-week program (launch session, weekly session, and closing session), and whose home environment and attire were verified to follow fall prevention protocols. Participants completed the fall prevention checklist and scored less than 4: https://www.ncoa.org/article/falls-prevention-conversation-guide-for-caregivers.

Patients having the following criteria were excluded from the study:

Any history of falls

Inability to consent

Care givers having any serious medical condition which would prevent long-term participation or contraindicate physical activity were excluded from the study.

Among all participants, those aged less than 18 years or greater than 75 years, unable to speak, read, and understand basic English, had any serious medical condition which would prevent long-term participation or contraindicate physical activity, exhibit evidence of cardiovascular, respiratory, or renal disease; auto-immune disease; advanced neuropathy or retinopathy; Infectious disease including HIV, AIDS, tuberculosis; or severe psychotic disorders, belong to a vulnerable population, which may include but not limited to pregnant women, human fetuses and neonates, prisoners, children, the handicapped, mentally disabled persons, persons with impaired capacity to consent, and students or employees of the study institution, those participating in another health study, those whose home environment and attire were not verified to follow fall prevention protocols, and those who scored ≥4 on the home prevention checklist, indicating that the participant may be at risk for a serious fall, were excluded from the study.

This study did not include vulnerable populations including, but may not be limited to, pregnant women, human fetuses and neonates, prisoners, children, the handicapped, mentally disabled persons, persons with impaired capacity to consent, and students or employees of the institution.

Pregnant women were not included in the study due to safety considerations. The program was designed to help participants exercise at low, moderate, and high intensity levels, which may pose unnecessary risks to pregnant women and their fetuses. If a participant became pregnant during the study, they were withdrawn from the study by the principal investigator and study team.

This research study included adults only, not children under age 18 or adults over 75 years of age. To ensure participant safety, the study did not enroll individuals who are unable to consent on their own and will not permit the use of legally authorized representatives.

The study was conducted in person at one central location in which the telehealth platform was utilized.

Thirty cancer patients and their caregivers participated in the in person program. The study lasted for a duration of eight weeks. The telehealth platform included at least 40 recorded classes at 3 levels of intensity (Low, Medium, High) and in four time durations or class length (15, 30, 45, and 60 minutes).

In week 1, participants were welcomed to the program with a 2-hour in person session. All participants participated together as a group, utilizing the telehealth platform. There were introductions, education, ice-breaker activities, and dance classes during the 2-hour session.

During weeks 2-7 participants participated in a 1-hour in person class each week utilizing the telehealth platform. Each session included bonding exercises, mindful movement, and art & creativity reflection.

In week 8, the final week of the study, participants were asked to participate in a final 2-hour session with a 45-60-minute dance class followed by a completion celebration. There were bonding exercises, mindful movement, art & creativity reflection, and time to provide feedback and suggestions to the study team during the 2-hour session. Participants were asked to complete a Net Promoter Score (NPS) survey, comprising a single question "On a scale of 0-10, how likely would you be to recommend [SERVICE/PRODUCT] to a friend or family member?"

Alternative options such as seated dances were offered to those participants who require them throughout the study.

Throughout the study, there were four intervals for data tracking: baseline, before the 8-week program, post 8-week program, and three months after. Participants complete a survey at the end of each session. Upon 8-weeks' completion, the study team sent a survey and interviewed the participants (lasting approximately 1-hour) for feedback (acceptance, satisfaction, ease of use). Participants discussed whether the program and the platform helped to reduce anxiety, depression, pain, and whether their bodies were more energized through participation in the program. Three months following completion of the study, the study team sends a final survey and conducts a follow up interview with each participant (lasting approximately 1-hour) for any updates since the completion of the program.

Figure 15:
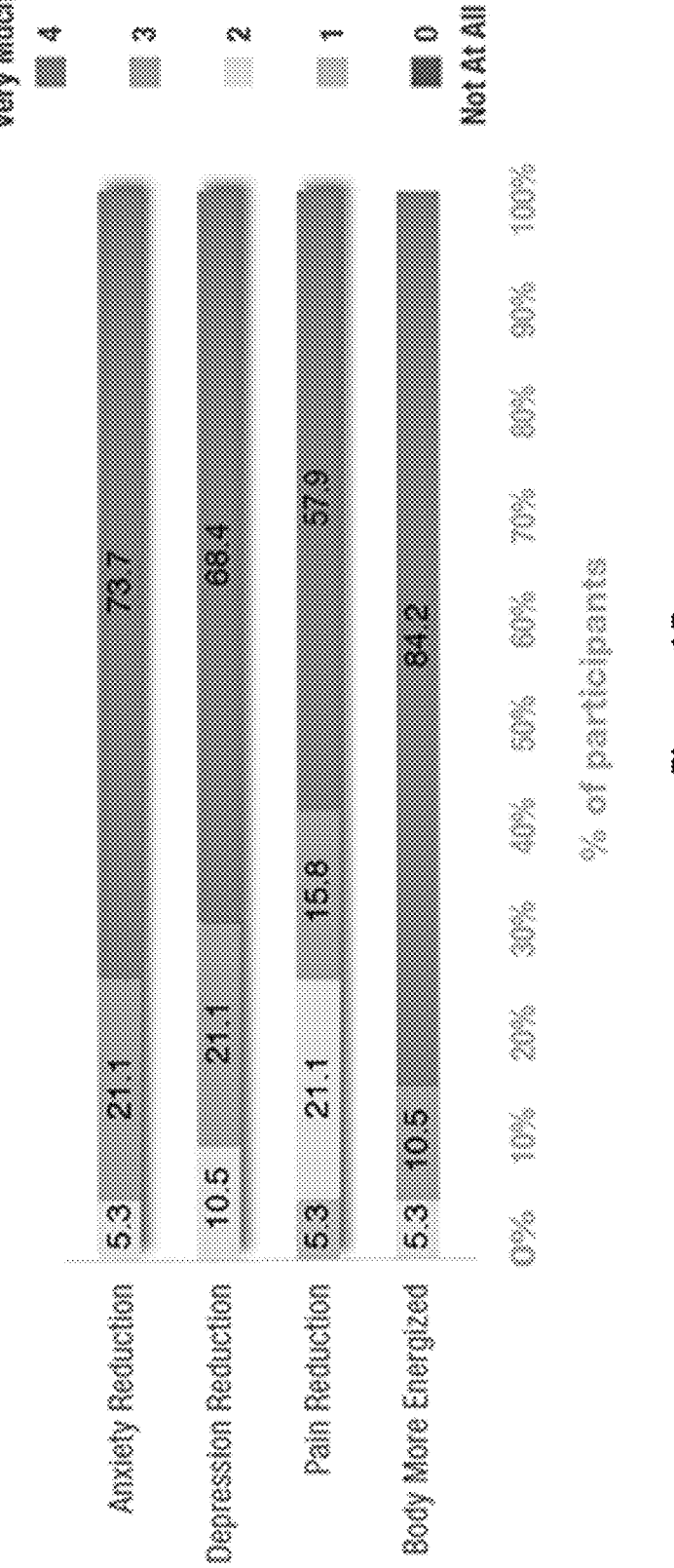
FIG. 15 is a graph showing post-study participation survey results in cancer patients who utilized the system.

The NPS survey results indicated that the program received a score of 91 compared to an average score of 24 for similar programs across the healthcare industry. The post-program survey results indicated that among the cancer patients who participated in the program, approximately 94.8% of participants indicated a reduction in anxiety, approximately 89.5% of participants indicated a reduction in depression, approximately 73.7% of participants indicated a reduction in pain, and approximately 94.7% of participants indicated that their bodies felt more energized, by virtue of participation in the study utilizing the telehealth platform. These results are shown in FIG. 15.

Having thus described in detail preferred embodiments of the present invention, it is to be understood that the invention defined by the above paragraphs is not to be limited to particular details set forth in the above description as many apparent variations thereof are possible without departing from the spirit or scope of the present invention.

What is claimed is:

1. A method for improving physical condition or mood of a subject suffering from a disease through personalized dance activity, and for building a subject data base, and for building a subject data set comprising providing a subject with a system, said system comprising:

at least one computer including at least one processor, at least one data storage unit coupled to the at least one processor, said data storage unit including:

the subject data base containing subject data base information and tracking information from the subject, wherein said subject data base information comprises unique user identifier information, demographic data, preference data, historical data, lifestyle data, real-time situational data, and real-time mood data, and wherein said tracking information comprises facial recognition data from the subject and physiological measurements of the subject from tracking information collection devices and comprising skeletal tracking data, or thermal tracking data, or oxygenation circulatory tracking data, the subject data set comprising subject data base information and tracking information from a plurality of users of the system, and a repository of live video classes or recorded dance videos, and the tracking information collection devices associated with the subject comprising an input device, a camera, and biosensor peripheral device(s) worn by the subject that communicate with the processor, wherein:

the system initiates and initially builds the subject data base by initially collecting subject data base information and tracking information via the tracking information collection devices from the subject initiating use of the system, the system analyzes and interprets the subject data base information and tracking information and makes determinations as to the subject's physiological state and mood and generates from data comprising the subject data base information and the tracking information, the determinations as to the subject's physiological state and mood, the repository of live video classes or recorded dance videos, and the subject data set, a selection of dance routines for the subject, the system presents to the subject the selection of dance routines, the system accepts from the subject the subject's selected dance routine, the system presents to the subject a recorded dance video or live video classes corresponding to the subject's selected dance routine, the system collects subject data base information and tracking information via the tracking information collection devices when the subject executes the subject's selected dance routine and engages in the personalized dance activity, and at the conclusion of the subject executing the subject's selected dance routine and engaging in the personalized dance activity, the system analyzes and interprets the subject data base information and tracking information from when the subject executes the subject's selected dance routine and engages in the personalized dance activity, and at the conclusion of the subject executing the subject's selected dance routine and engaging in the personalized dance activity, and makes determinations as to the subject's physiological state and mood, whereby the system tracks improvement in the subject's physiological state and mood and refines its ability to generate and present dance routine selections for the subject in each subsequent use by the subject, the system builds the subject data set by adding the subject data base information and tracking information to the subject data set, and the system continues to build the subject data base and the subject data set with each subsequent use of the system by the subject by collecting subject data base information and tracking information via the tracking information collection devices from each subsequent use of the system by the subject, and adding that subsequent use subject data base information and tracking information to the subject data set, and the subject has initial use of the system and has at least one subsequent use of the system, wherein, in the initial use of the system, the system receives subject data base information and tracking information of the subject from the tracking information collection devices and, initiates and initially builds the subject data base from the subject initiating use of the system, the system analyzes and interprets the subject data base information and tracking information and makes first determinations as to the subject's physiological state and mood and generates from data comprising the subject data base information and the tracking information, the determinations as to the subject's physiological state and mood, the repository of live video classes or recorded dance videos, and the subject data set, a first selection of dance routines for the subject, the system presents to the subject the first selection of dance routines, the system accepts from the subject the subject's first selected dance routine, the system presents to the subject a dance video corresponding to the subject's first selected dance routine, the system collects subject data base information and tracking information via the tracking information collection devices when the subject executes the subject's first selected dance routine and engages in the personalized dance activity, and at the conclusion of the subject executing the subject's first selected dance routine and engaging in the personalized dance activity, the system analyzes and interprets the subject data base information and tracking information from when the subject executes the subject's first selected dance routine and engages in the personalized dance activity, and at the conclusion of the subject executing the subject's first selected dance routine and engaging in the personalized dance activity, and makes first determinations as to the subject's physiological state and mood, whereby the system tracks improvement in the subject's physiological state and mood and refines its ability to generate and present dance routine selections for the subject in each subsequent use by the subject, the system builds the subject data set by adding the subject data base information and tracking information to the subject data set, in each subsequent use of the system, the system receives subject data base information and tracking information of the subject from the tracking information collection devices and, builds the subject data base from the subject's subsequent use of the system, the system analyzes and interprets the subject data base information and tracking information and makes determinations as to the subject's physiological state and mood and generates from data comprising the subject data base information and the tracking information, including from the subject's earlier use of the system, the determinations as to the subject's physiological state and mood, the repository of live video classes or dance videos, and the subject data set, a second selection of dance routines for the subject, the system presents to the subject the second selection of dance routines, the system accepts from the subject the subject's second selected routine, the system presents to the subject a dance video corresponding to the subject's second selected dance routine, the system collects subject data base information and tracking information via the tracking information collection devices when the subject executes the subject's second selected dance routine and engages in the personalized dance activity, and at the conclusion of the subject executing the subject's second selected dance routine and engaging in the personalized dance activity, the system analyzes and interprets the subject data base information and tracking information from when the subject executes the subject's second selected dance routine and engages in the personalized dance activity, and at the conclusion of the subject executing the subject's second selected dance routine and engaging in the personalized dance activity, and from that subject data base information and tracking information and from the subject's earlier use of the system, the system makes determinations as to the subject's physiological state and mood, whereby the system tracks improvement in the subject's physiological state and mood and refines its ability to generate and present dance routine selections for the subject in each subsequent use by the subject, and the system builds the subject data set by adding the subject data base information and tracking information from each subsequent use to the subject data set, whereby there is improving of the physical condition or mood of the subject through personalized dance activity, and there is building of the subject data base, and building of the subject data set.

2. The method of claim 1, wherein the disease is pre-diabetes, diabetes mellitus, hypertension, cardiovascular disease, a cancer, a neurological disorder, or a mental illness.

3. The method of claim 2, wherein the neurological disorder is Alzheimer's disease or an Alzheimer's disease-related dementia.

4. The method of claim 1, wherein the tracking information collection devices associated with the subject further comprises a voice user interface, wherein the voice user interface is configured to receive audio data from the subject and to communicate with the processor, wherein the audio data comprises the subject's voice.

5. The method of claim 4, wherein the tracking information further comprises the subject's mood obtained from audio data.

6. The method of claim 4, wherein the voice user interface provides audio feedback to the subject after receiving the audio data and communication with the processor.

7. The method of claim 4, wherein the voice user interface is configured to receive audio data in a non-English language.

8. The method of claim 7, wherein the voice user interface provides audio feedback to the subject after receiving the audio data and communication with the processor, wherein the audio feedback is in the non-English language.

9. The method of claim 1, wherein the tracking information comprises tracking of emotions of the subject before, during and after dance, or duration of dance.

10. The method of claim 1, wherein the system comprises subject data base information as to a plurality of subjects, and the subject data set comprises information as to a plurality of users of the computer system.

11. The method of claim 10, wherein in generating the selection of dance routines, the system additionally analyzes the subject data set and matches the subject with at least one buddy who is one of the plurality of users of the system, and presents the at least one buddy to the subject with the selection of dance routines, the system accepts from the subject the subject's selected dance routine and selection of the buddy, and system presents to the subject and the buddy the subject's selected dance routine, whereby the system provides for the subject and the buddy performing together the subject's selected dance routine.

12. The method of claim 10, wherein the system additionally analyzes the subject data set and matches the subject with a teacher who is one of the plurality of users of the system, and presents the teacher to the subject with the selection of dance routines, the system accepts from the subject the subject's selected dance routine and selection of the teacher, and the system presents to the subject and the teacher the subject's selected dance routine, whereby the system provides for the subject and the teacher performing together the subject's selected dance routine.

13. The method of claim 12, wherein the physiological measurements of the subject and the teacher comprise skeletal tracking data, and the system compares the subject skeletal tracking data and the teacher skeletal tracking data and communicates to the subject whether the subject is matching movement of the teacher for the subject's selected dance routine.

14. A system for improving physical condition or mood of a subject of a subject through personalized dance activity, and for building a subject data base, and for building a subject data set comprising providing a subject with a system, said system comprising:

at least one computer including at least one processor, at least one data storage unit coupled to the at least one processor, said data storage unit including:

the subject data base containing subject data base information and tracking information from the subject, wherein said subject data base information comprises unique user identifier information, demographic data, preference data, historical data, lifestyle data, real-time situational data, and real-time mood data, and wherein said tracking information comprises facial recognition data from the subject and physiological measurements of the subject from tracking information collection devices and comprising skeletal tracking data, or thermal tracking data, or oxygenation circulatory tracking data, the subject data set comprising subject data base information and tracking information from a plurality of users of the system, and a repository of live video classes or recorded dance videos, and the tracking information collection devices associated with the subject comprising an input device, a camera, a voice user interface, and biosensor peripheral device(s) worn by the subject that communicate with the processor, wherein the voice user interface is configured to receive audio data from the subject and to communicate with the processor, wherein the audio data comprises the subject's voice, wherein:

the system initiates and initially builds the subject data base by initially collecting subject data base information and tracking information via the tracking information collection devices from the subject initiating use of the system, the system analyzes and interprets the subject data base information and tracking information and makes determinations as to the subject's physiological state and mood and generates from data comprising the subject data base information and the tracking information, the determinations as to the subject's physiological state and mood, the repository of live video classes or recorded dance videos, and the subject data set, a selection of dance routines for the subject, the system presents to the subject the selection of dance routines, the system accepts from the subject the subject's selected dance routine, the system presents to the subject a recorded dance video or live video classes corresponding to the subject's selected dance routine, the system collects subject data base information and tracking information via the tracking information collection devices when the subject executes the subject's selected dance routine and engages in the personalized dance activity, and at the conclusion of the subject executing the subject's selected dance routine and engaging in the personalized dance activity, the system analyzes and interprets the subject data base information and tracking information from when the subject executes the subject's selected dance routine and engages in the personalized dance activity, and at the conclusion of the subject executing the subject's selected dance routine and engaging in the personalized dance activity, and makes determinations as to the subject's physiological state and mood, whereby the system tracks improvement in the subject's physiological state and mood and refines its ability to generate and present dance routine selections for the subject in each subsequent use by the subject, the system builds the subject data set by adding the subject data base information and tracking information to the subject data set, and the system continues to build the subject data base and the subject data set with each subsequent use of the system by the subject by collecting subject data base information and tracking information via the tracking information collection devices from each subsequent use of the system by the subject, and adding that subsequent use subject data base information and tracking information to the subject data set.

15. The system of claim 14, wherein the tracking information further comprises the subject's mood or stress level obtained from audio data.

16. The system of claim 14, wherein the voice user interface is configured to detect a change or deviation from the user's baseline voice, wherein the change or deviation comprises one or more changes in phonation, pitch, loudness, and rate.

17. The system of claim 14, wherein the voice user interface provides audio feedback to the subject after receiving the audio data and communication with the processor.

18. The system of claim 14, wherein the voice user interface is configured to receive audio data in a non-English language.

19. The system of claim 18, wherein the voice user interface provides audio feedback to the subject after receiving the audio data and communication with the processor, wherein the audio feedback is in the non-English language.

20. The system of claim 14, wherein the subject data base information analyzed by the system comprises at least one preference data, wherein the at least one preference data comprises the user's favorite music to generate the selection of dance routines for the subject.

* * * * *